US008473724B1

(12) United States Patent (10) Patent No.: US 8,473,724 B1
Kenville et al. (45) Date of Patent: Jun. 25, 2013

(54) CONTROLLING OPERATION OF A PROCESSOR ACCORDING TO EXECUTION MODE OF AN INSTRUCTION SEQUENCE

(75) Inventors: Thomas James Kenville, Felton, CA (US); Anshuman Shrikant Nadkarni, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1200 days.

(21) Appl. No.: 11/774,583

(22) Filed: Jul. 7, 2007

Related U.S. Application Data

(60) Provisional application No. 60/806,786, filed on Jul. 9, 2006.

(51) Int. Cl.
*G06F 9/00* (2006.01)

(52) U.S. Cl.
USPC ........................................................ 712/229

(58) Field of Classification Search
None
See application file for complete search history.

(56) References Cited

U.S. PATENT DOCUMENTS

| 6,202,130 | B1 * | 3/2001 | Scales et al. ................... 711/137 |
| 7,096,344 | B2 * | 8/2006 | Miyamori ........................ 712/34 |
| 7,130,951 | B1 * | 10/2006 | Christie et al. ................ 710/261 |
| 7,149,878 | B1 * | 12/2006 | Jensen et al. .................... 712/209 |
| 7,155,600 | B2 * | 12/2006 | Burky et al. ................... 712/229 |
| 7,395,382 | B1 * | 7/2008 | Moir .............................. 711/147 |
| 7,487,330 | B2 * | 2/2009 | Altman et al. .................. 712/43 |
| 2004/0210748 | A1 * | 10/2004 | Liang ............................ 712/229 |
| 2005/0262329 | A1 * | 11/2005 | Krishnan et al. .............. 712/210 |
| 2007/0083871 | A1 * | 4/2007 | McKenney .................... 718/105 |

* cited by examiner

*Primary Examiner* — Jacob A Petranek
(74) *Attorney, Agent, or Firm* — Osha Liang LLP

(57) ABSTRACT

In a processor, instructions of an instruction stream are supplied to an execution unit which executes the supplied instructions according to respective execution modes. A control unit recognizes a user-defined instruction sequence (UDIS) in the instruction stream. The UDIS is associated with a UDIS definition provided in-line and/or as contents of machine-state registers (MSRs), and specifying, at least in part, a start, optionally an end, and a particular execution mode for the UDIS. Subsequently, ones of the instructions of the UDIS are executed in accordance with the particular execution mode, such as by optionally altering recognition of asynchronous events. For example, disabling hardware interrupts during the executing results in apparent atomic execution. Fetching, decoding, issuing, and/or caching of the instructions of the UDIS are optionally dependent on the particular execution mode. MSRs optionally specify a maximum length and/or execution time.

38 Claims, 10 Drawing Sheets

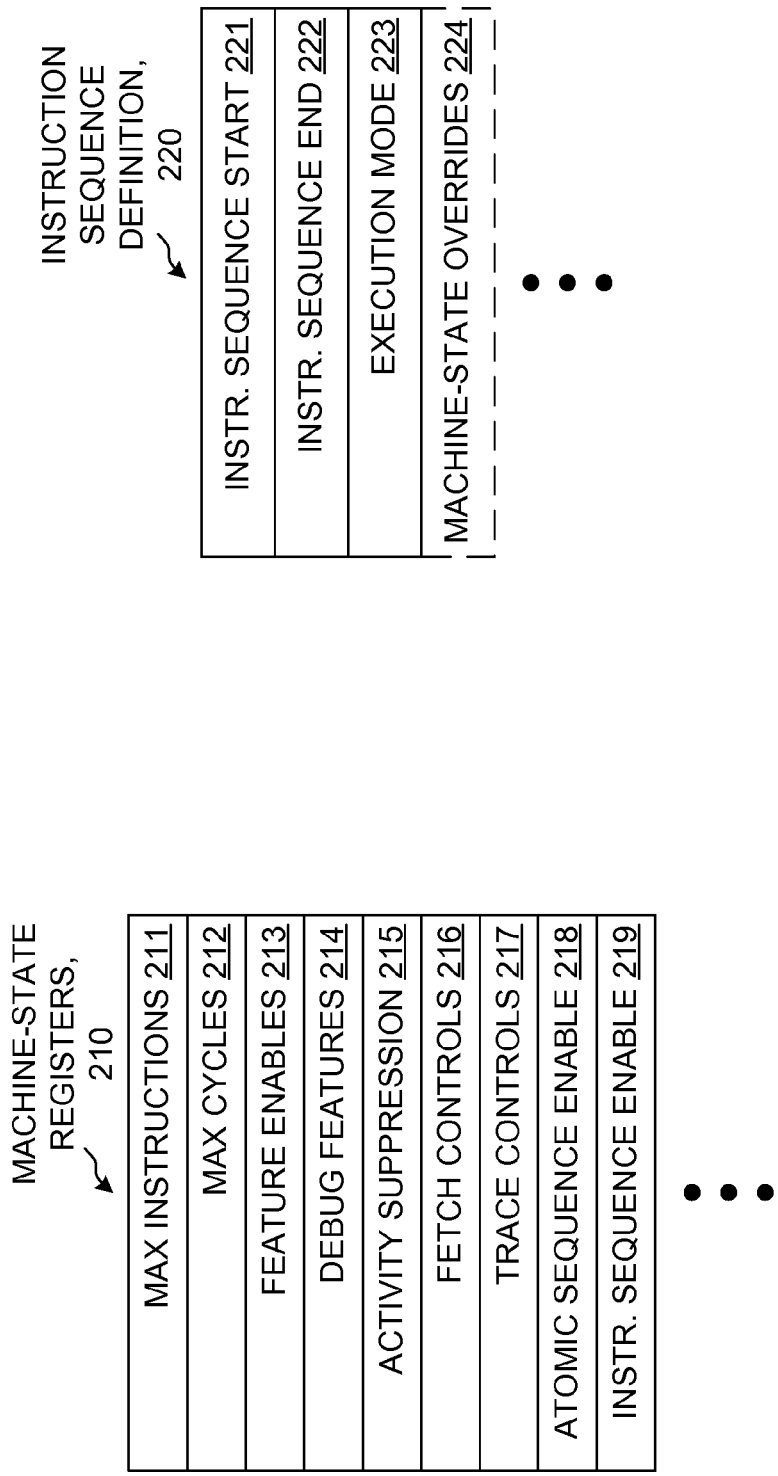

CONTROLLING OPERATION OF A PROCESSOR ACCORDING TO EXECUTION MODE OF AN INSTRUCTION SEQUENCE

CROSS REFERENCE TO RELATED APPLICATIONS

Priority benefit claims for this application are made in the accompanying Application Data Sheet (if any). To the extent permitted by the type of the instant application, this application incorporates by reference for all purposes the following application(s), which are all owned by the owner of the instant application:

U.S. Provisional Application Ser. No. 60/721,385, filed Sep. 28, 2005, first named inventor Leonard Shar, and entitled EFFICIENT TRACE CACHE MANAGEMENT DURING SELF-MODIFYING CODE PROCESSING;

U.S. Provisional Application Ser. No. 60/730,550, filed Oct. 26, 2005, first named inventor John Gregory Favor, and entitled CHECKPOINTING STATUS FLAGS FOR ATOMIC TRACES;

U.S. Provisional Application Ser. No. 60/730,810, filed Oct. 27, 2005, first named inventor Greg Favor, and entitled ALLOCATION AND DEALLOCATION OF SHADOW REGISTERS USED BY ATOMIC TRACES;

U.S. Provisional Application Ser. No. 60/731,962, filed Oct. 31, 2005, first named inventor Greg Favor, and entitled DETERMINING THE HIGHEST PRIORITY ABORT TRIGGER IN AN ATOMIC TRACE; U.S. Provisional Application Ser. No. 60/731,785, filed Oct. 31, 2005, first named inventor Richard W. Thaik, and entitled MAINTAINING MEMORY COHERENCY WITHIN A TRACE CACHE; U.S. Provisional Application Ser. No. 60/806,786, filed Jul. 9, 2006, first named inventor Tom Kenville, and entitled EXECUTION MODES APPLIED TO INSTRUCTION SEQUENCES; U.S. Provisional Application Ser. No. 60/832,848, Jul. 23, 2006, first named inventor Don Alpert, and entitled MICROPROCESSOR WITH CACHES FOR INSTRUCTIONS, BASIC BLOCKS, AND TRACES; U.S. Provisional Application Ser. No. 60/832,822, Jul. 23, 2006, first named inventor Don Alpert, and entitled MICROPROCESSOR WITH COHERENT CACHES FOR BASIC BLOCKS AND TRACES; U.S. Non-Provisional application Ser. No. 11/535,971, filed Sep. 27, 2006, first named inventor Leonard Eric Shar, and entitled EFFICIENT TRACE CACHE MANAGEMENT DURING SELF-MODIFYING CODE PROCESSING;

U.S. Non-Provisional application Ser. No. 11/535,972, filed Sep. 27, 2006, first named inventor Leonard Eric Shar, and entitled SELECTIVE TRACE CACHE INVALIDATION FOR SELF-MODIFYING CODE VIA MEMORY AGING;

U.S. Non-Provisional application Ser. No. 11/535,977, filed Sep. 27, 2006, first named inventor Leonard Eric Shar, and entitled TRACE CACHE FOR EFFICIENT SELF-MODIFYING CODE PROCESSING;

U.S. Provisional Application Ser. No. 60/862,609, filed Oct. 24, 2006, first named inventor Christopher P. Nelson, and entitled EXCEPTION HANDLING FOR ATOMIC TRACES;

U.S. Non-Provisional application Ser. No. 11/553,453, filed Oct. 26, 2006, first named inventor Greg Favor, and entitled CHECKPOINTING STATUS FLAGS FOR ATOMIC TRACES;

U.S. Non-Provisional application Ser. No. 11/553,455, filed Oct. 26, 2006, first named inventor John Gregory Favor, and entitled CHECKPOINTING FLAGS ON-DEMAND FOR ATOMIC TRACES;

U.S. Non-Provisional application Ser. No. 11/553,458, filed Oct. 26, 2006, first named inventor John Gregory Favor, and entitled FLAG RESTORATION FROM CHECKPOINTS FOR ABORTS OF ATOMIC TRACES;

U.S. Non-Provisional application Ser. No. 11/591,024, filed Oct. 31, 2006, first named inventor John Gregory Favor, and entitled MAINTAINING MEMORY COHERENCY WITHIN A TRACE CACHE;

U.S. Provisional Application Ser. No. 60/866,205, filed Nov. 16, 2006, first named inventor John Gregory Favor, and entitled PROCESSOR WITH OPTIMIZED OPERATION SEQUENCES FOR BASIC BLOCK AND MULTI-BLOCK TRACE CACHES; and U.S. Provisional Application Ser. No. 60/866,203, filed Nov. 16, 2006, first named inventor Matt Ashcraft, and entitled PROCESSOR WITH BASIC BLOCK AND MULTI-BLOCK TRACE CACHES.

This application is related to the following application(s) filed simultaneously herewith and which are all owned by the owner of the instant application, and to the extent permitted by the type of the instant application, this application incorporates by reference for all purposes the following application(s):

U.S. Non-Provisional application Ser. No. 11/774,581 entitled EXECUTING INSTRUCTION SEQUENCES ACCORDING TO EXECUTION MODE.

BACKGROUND

A processor (such as a microprocessor) processes instructions according to an architecture of the processor, the instructions having a format defined by an instruction set architecture portion of the architecture. The processing includes fetching, decoding, issuing, and executing the instructions. Some processors directly execute instructions, whereas other processors translate instructions into internal operations (sometimes called micro-operations) and execute operations that perform an equivalent function to the instructions. In processors translating instructions, conceptually the instructions are considered to be underlying the internal operations.

Some instruction set architectures (such as an X86-compatible instruction set architecture) include complex instructions. Some microprocessor implementations include translation hardware to convert instructions (including complex instructions) into sequences of one or more relatively simpler operations, referred to as micro-operations. Additionally, certain implementations store sequences of micro-operations that correspond to one or more instructions in a cache, such as a trace cache. For example, Intel's Pentium 4 microprocessor, as described by Hinton, et al (in "The Microarchitecture of the Pentium 4 Processor", Intel Technology Journal, Q1, 2001), has a trace cache.

One issue in some processor systems is difficulty of achieving user-control over the precise semantics of instruction execution. For example, asynchronous events such as non-maskable interrupts, system-management interrupts, power-management interrupts, and I/O interrupts are enabled to temporarily disrupt the normal program flow. A lack of atomic sequences of execution has multiple consequences. First, programs wishing to do accurate timing or tracing are not able to rely on even short sequences of instructions taking a predictable time due to asynchronous events that temporarily disrupt normal program flow. Second, in some usage scenarios and with some code sequences, such as those doing state-switching, an asynchronous event induces a failure.

All of the foregoing patents and references are hereby incorporated by reference for all purposes.

SUMMARY OF THE INVENTION

The invention, in response to limitations of prior approaches, provides for controlling operation of a processor according to execution mode of an instruction sequence. In some embodiments, a method for use in a processor includes supplying, executing, recognizing, and controlling. The supplying supplies information derived from at least some instructions of an instruction stream to at least some of one or more execution units. The executing executes the at least some of the instructions by the at least some of the execution units. The recognizing recognizes, in accordance with the instruction stream, a start of an instruction sequence. The controlling controls, at least in part, operation with respect to each of the at least some of the instructions by an execution mode of the instruction. The instruction sequence is specified by an instruction sequence definition, and the instruction sequence includes a plurality of the instructions. The instruction sequence definition specifies a location of a last one of the instructions of the instruction sequence, and specifies a particular one of the execution modes.

In some embodiments, a processor includes an instruction supply unit, a control circuit, and one or more execution units. The instruction supply unit is enabled to supply information derived from at least some instructions of an instruction stream to at least some of the execution units. The control circuit is enabled to recognize, in accordance with the instruction stream, a start of an instruction sequence. The at least some of the execution units are enabled to perform execution of the at least some of the instructions. Operation with respect to each of the at least some of the instructions is enabled to be controlled by an execution mode of the instruction. The instruction sequence is specified by an instruction sequence definition, and the instruction sequence includes a plurality of the instructions. The instruction sequence definition specifies a location of a last one of the instructions of the instruction sequence, and specifies a particular one of the execution modes.

In some embodiments, a system includes means for supplying, means for executing, means for recognizing, and means for controlling. The means for supplying is operable to supply information derived from at least some instructions of an instruction stream. The means for executing is operable to execute, in response to the means for supplying, the at least some of the instructions. The means for recognizing is operable to recognize, in accordance with the instruction stream, a start of an instruction sequence. The means for controlling is operable to control, at least in part, operation with respect to each of the at least some of the instructions by an execution mode of the instruction. The instruction sequence is specified by an instruction sequence definition, and the instruction sequence includes a plurality of the instructions. The instruction sequence definition specifies a location of a last one of the instructions of the instruction sequence, and specifies a particular one of the execution modes.

In some embodiments, a medium readable by a computer system contains descriptions that specify, when processed by the computer system, a circuit including an instruction supply sub-circuit, a control sub-circuit, and one or more execution sub-circuits. The instruction supply sub-circuit is enabled to supply information derived from at least some instructions of an instruction stream to at least some of the execution sub-circuits. The control sub-circuit is enabled to recognize, in accordance with the instruction stream, a start of an instruction sequence. The at least some of the execution sub-circuits are enabled to perform execution of the at least some of the instructions. Operation with respect to each of the at least some of the instructions is enabled to be controlled by an execution mode of the instruction. The instruction sequence is specified by an instruction sequence definition, and the instruction sequence includes a plurality of the instructions. The instruction sequence definition specifies a location of a last one of the instructions of the instruction sequence, and specifies a particular one of the execution modes.

The invention is optionally embodied in various embodiments, including but not limited to one or more of a process, an article of manufacture, an apparatus, a system, a composition of matter, and a computer readable medium such as a computer readable storage medium or a computer network wherein program instructions, interpretable parameters, and/or hardware descriptions are sent over optical or electronic communication links.

DESCRIPTION OF THE FIGURES

FIG. 2A illustrates examples of machine-state registers for controlling user-defined instruction sequence processing.

FIG. 2B illustrates selected details of an embodiment of a user-defined instruction sequence definition.

DETAILED DESCRIPTION OF EMBODIMENTS OF THE INVENTION

Figure 1:
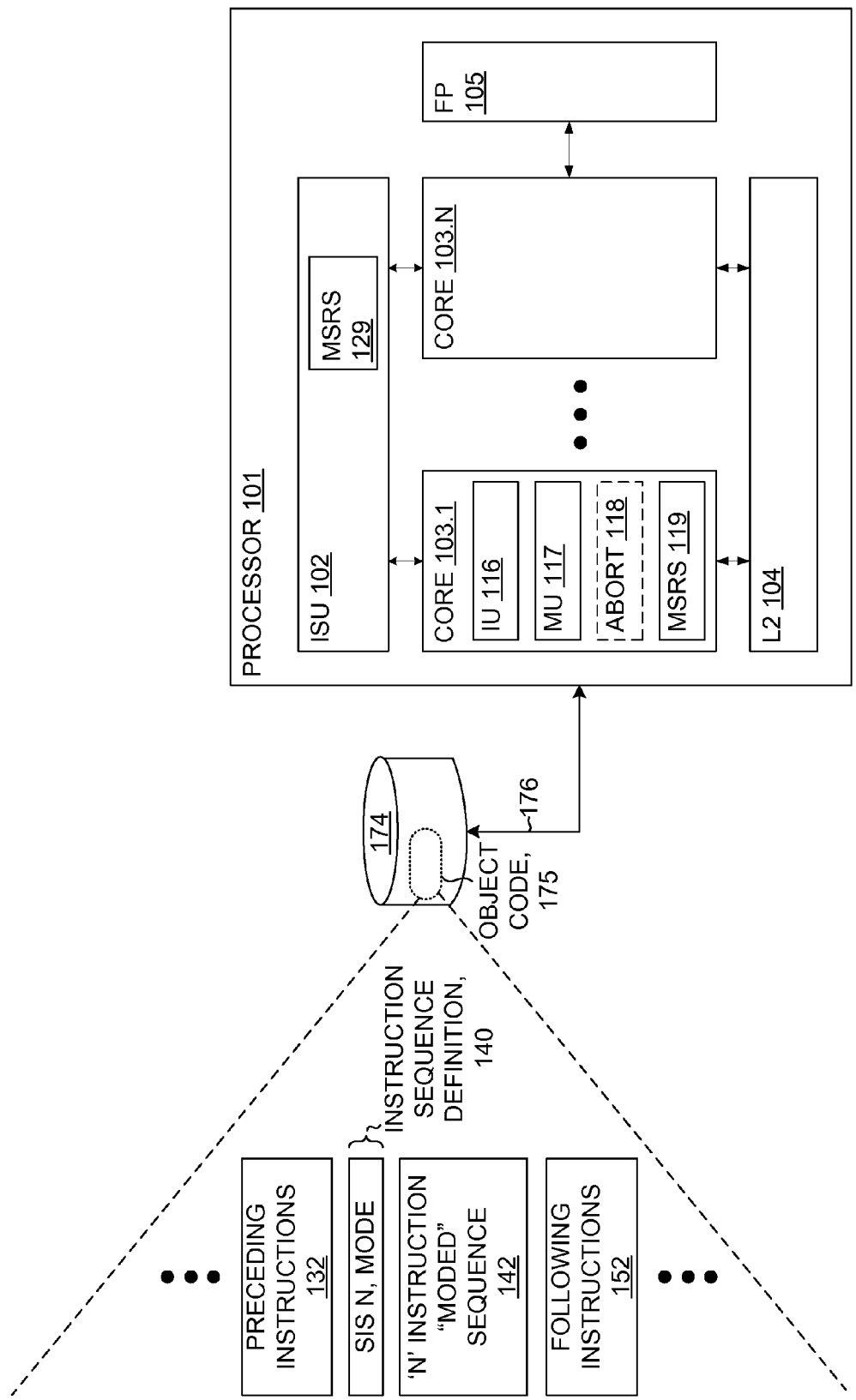
FIG. 1 illustrates an embodiment of a processor incorporating execution modes for user-defined instruction sequences.

A detailed description of one or more embodiments of the invention is provided below along with accompanying figures illustrating selected details of the invention. The invention is described in connection with the embodiments. It is well established that it is not necessary, not practical, and impossible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that, in accordance with a predetermined or a dynamically determined criterion, perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. As is described in more detail in the Conclusion section, the invention encompasses all possible modifications and variations within the scope of the issued claims.

Introduction

This introduction is included only to facilitate the more rapid understanding of the Detailed Description. The invention is not limited to the concepts described in the introduction, as the paragraphs of any introduction are necessarily an abridged view of the entire subject and are not meant to be an exhaustive or restrictive description. For example, the introduction that follows provides overview information limited by space and organization to only some embodiments. There are in fact many other embodiments, including those to which claims will ultimately be drawn, that are described throughout the balance of the specification.

Acronyms

Elsewhere herein various shorthand abbreviations, or acronyms, are used to refer to certain elements. Descriptions of some of the acronyms follow.

| Acronym | Description |
| --- | --- |
| EIS | End Instruction Sequence |
| ID | Identifier |
| I/O | Input/Output |
| ISU | Instruction Supply Unit |
| MSR | Machine-State Registers |
| SIS | Start Instruction Sequence |
| UDIS | User-Defined Instruction Sequence |

Terms

An example of an instruction is a collection of bits that specify a particular function to be performed in response to the collection of bits. An example of a hardwired instruction type is a class of instructions that is relatively simple and that is processed as a relatively small number of operations, such as via combinational gates. An example of a microcoded instruction type is a class of instructions that is relatively complex and that is processed as a relatively large number of operations, such as a sequence of simple operations, the sequence specified via references to a storage element (such as a read-only memory or programmable logic array). An example of an instruction image is a sequence of instructions, such as instructions forming all or a portion of a program, to be executed by a processor. An instruction image includes a sequence of basic blocks. Each basic block includes a sequence of instructions, optionally ending with a branch instruction, and with no internal branch instructions. In some usage scenarios, one or more instruction images are represented by one or more portions of object code.

An example of an instruction stream is a sequence of instructions from an instruction image in program order, the program order differing from a sequential order of instructions in the instruction image due to execution of branch instructions. In some usage scenarios, an instruction image is a spatial sequence of instructions, whereas an instruction stream is a temporal sequence of instructions. In some usage scenarios, an instruction stream is represented as a sequence of basic blocks from an instruction image in program (temporal) order, the program order differing from a sequential (spatial) order of basic blocks in the instruction image due to execution of branch instructions as the final instruction in one or more basic blocks. In some embodiments, one or more of the branch instructions are explicitly represented in the instruction image. In some embodiments, one or more of the branch instructions arise implicitly due to an exception detected during execution of the program (such as an asynchronous external interrupt or a synchronous exception from an instruction of the program). In some embodiments, one or more of the branch instructions are implicitly represented in the instruction image. For example, in some embodiments, certain complex instructions translate into a sequence of operations including a branch operation.

In some embodiments, a processor contains "machine-state registers" that control operation of the processor. In some usage scenarios, machine-state registers are variously called "model-specific registers" or "machine-specific registers". According to various embodiments, machine-state registers are written by one or more of instructions, memory mapped references, co-processor instructions, and other processors such as a control processor. In some embodiments and/or usage scenarios, some or all of the machine-state registers are modifiable by privileged instructions, such as supervisor instructions. In some embodiments, machine-state registers are written as a side effect of execution of instructions and/or instruction sequences. According to various embodiments, machine-state registers are constructed out of one or more of flip-flops, latches, register arrays, and random-access memory.

In some embodiments, an "execution mode" is a set of parameters controlling operation (such as fetching, decoding, translating, or executing) of a processor. According to various embodiments, the execution mode includes one or more of interrupt settings (enabled or disabled) for various types of interrupts, whether super-scalar vs. single-instruction-at-a-time execution is active, whether out-of-order execution is enabled, whether branch prediction is enabled, whether caches are enabled or disabled, enabled modes of memory access, privilege level (such as supervisor or user), whether certain instructions are enabled, and other similar execution control settings. Many aspects of operation of the processor are controllable through machine-state registers and/or other state within or accessed by the processor, and the execution mode includes some or all of the controllable aspects. In various embodiments, operation of the processor with respect to individual ones of instructions is enabled for control by an execution mode of the instruction. For example, in some pipelined embodiments, at least a portion of the execution mode of each of a plurality of instructions travels down a pipeline of the processor along with other information of the instruction, enabling at least some aspects of operation of each of the instructions to be independently controllable.

According to various embodiments, the processor is one or more of a single-core processor, a multi-core processor, an embedded processor, a general-purpose processor, and any other type or processor. According to various embodiments, the processor uses one or more of: Single Instruction, Single Data (SISD) techniques; Single Instruction, Multiple Data (SIMD) techniques; Multiple Instruction, Multiple Data (MIMD) techniques; Very-Long Instruction Word (VLIW) techniques; super-scalar techniques; out-of-order execution techniques; speculative execution techniques; trace-based execution techniques; and any other type of processor architecture, microarchitecture, and/or implementation techniques. In some embodiments where the processor uses SIMD techniques, each of a plurality of data execution portions of the processor is, at least in part, independently controllable according to an execution mode of the processor. In some embodiments where the processor is a multi-core processor, each of a plurality of cores of the processor is, at least in part, independently controllable according to an execution mode of the processor. In further embodiments, each of the cores is independently controllable according to an execution mode of the respective core. In some embodiments where the processor includes a plurality of cores, processes and/or threads are enabled to migrate from one of the cores to another of the cores. In further embodiments, some of the cores have different features and/or capabilities than others of the cores. For example, in some embodiments, not all of the cores have, or have access to, a particular type of unit, such as a floating-point unit and/or an encryption unit. In various embodiments, an execution mode of the processor is enabled to control, at least in part, a set of the cores on which a particular process and/or thread is enabled to execute.

In some embodiments where architectural instructions are translated into machine operations, sometimes called micro-operations, the execution mode further includes various modes of such translations, including, for example, whether optimizations are performed during the translations, any assumptions made during the translation (such as whether I/O memory is being accessed), the types of translations that are performed, and other translation controls. In further embodiments where a trace cache is used to hold translated sequences of architectural instructions, the execution mode includes controls for the trace cache, including, for example, whether the trace cache is enabled, which one of several trace caches to use, whether a translated trace is "sticky" in a trace cache, whether a trace is enabled for promotion from one trace cache structure (such as a basic block cache) to another trace cache structure (such as a multi-block cache), what mechanisms to enable for optimization of traces, and other trace cache control settings. See the aforementioned U.S. Provisional Application Ser. No. 60/866,203 entitled PROCESSOR WITH BASIC BLOCK AND MULTI-BLOCK TRACE CACHES for additional information on trace cache embodiments.

The use of the term "execution", with respect to execution modes, should not be construed to be limiting, in that in various embodiments, execution modes control processor operation during pipe stages with names such as "instruction fetch", "translate", "decode", "register renaming", "cache access", and "writeback", and these pipe stages occur in a processor pipeline prior to or subsequent to an "execute" pipe stage. While many of the embodiments herein refer to interrupt settings as an example of an execution mode, all of the controllable aspects of the processor in any pipe stage of the processor are considered to be examples of execution modes.

An example of a "trace" is a finite sequence of dynamically consecutive (according to program order) instructions. In some embodiments, a trace executes in an associated execution mode. For example, a trace executed by operating system code runs in a supervisor execution mode, whereas a trace executed by an application program runs in a lesser-privileged, user execution mode.

An example of an "atomic trace" is a trace that is treated, in its entirety, as a single instruction or as having a single entry and a single exit. In some scenarios, atomic traces are produced by hardware translation of sequences of instructions used by software according to a reference architecture. In some scenarios, atomic traces are produced by software and/or by software translation and/or optimization. In some scenarios, atomic traces are user-defined. In some embodiments and/or usage scenarios, an atomic trace optionally includes more than one basic block, i.e. includes one or more interior conditional branches. As a degenerate case, an atomic trace is a single instruction. In some embodiments, speculative execution restore points correspond to atomic trace boundaries.

In some embodiments, a "User-Defined Instruction Sequence" (UDIS) is a user-specified, statically consecutive, sequence of instructions. According to various embodiments, a user-defined instruction sequence: is defined via a beginning instruction, and a length in statically consecutive instructions; is defined as multiple, statically consecutive sequences of instructions; is a user-specified, dynamically consecutive sequence of instructions having a beginning instruction or beginning location, and a length and/or an end specified by at least one of a number of instructions, a number of bytes, an ending location, and an execution time (such as a time measured in clock cycles); and is defined as all instructions in and/or wholly contained within a span of memory, such as memory from a beginning location to an ending location. In some embodiments, a user-defined instruction sequence is defined as all instructions in and/or wholly contained within a span of memory, the user-defined instruction sequence does not have a specified beginning instruction and/or a specified ending instruction, and the user-defined instruction sequence optionally includes multiple sequences of instructions, such as multiple functions or subroutines. A user-defined instruction sequence executes in an associated execution mode, and the associated execution mode is one factor distinguishing the user-defined instruction sequence from surrounding instructions. For brevity hereinafter, a user-defined instruction sequence is also referred to simply as an "instruction sequence".

In some embodiments, an "atomic instruction sequence" includes a user-defined instruction sequence where the execution mode specifies non-interruptible execution of the instruction sequence.

The term "byte" is used to refer to a unit of addressable storage within a processor, and a size of a byte varies according to various embodiments. In some processors, the unit of addressable storage is eight bits. In other processors, the unit of addressable storage is 32 bits. In still other processors, a data portion of the processor has a different unit of addressable storage from a code portion of the processor.

Overview

Greater user control of execution modes is advantageously provided by controlling operation of a processor according to execution mode of an instruction sequence}. In a processor, instructions of an instruction stream are supplied to an execution unit which executes the supplied instructions according to respective execution modes. A control unit recognizes a user-defined instruction sequence (UDIS) in the instruction stream. The UDIS is associated with a UDIS definition provided in-line and/or as contents of machine-state registers (MSRs), and specifying, at least in part, a start, optionally an end, and a particular execution mode for the UDIS. Subsequently, ones of the instructions of the UDIS are executed in accordance with the particular execution mode, such as by optionally altering recognition of asynchronous events. For example, disabling hardware interrupts during the executing results in apparent atomic execution. Fetching, decoding, issuing, and/or caching of the instructions of the UDIS are optionally dependent on the particular execution mode. MSRs optionally specify a maximum length and/or execution time (such as a time measured in clock cycles) of the UDIS.

In some embodiments, a processor includes an Instruction Supply Unit (ISU) that supplies decoded and/or translated instructions to an execution portion of the processor, and the execution portion executes the decoded and/or translated instructions. In various embodiments, the instruction supply unit fetches instructions, such as from a main memory or from a cache. The fetched instructions are decoded and/or translated into a form, such as operations, micro-operations, or as a series of bits controlling various aspects of the processor, and the decoded/translated instructions are supplied to the execution portion for execution. The instruction supply unit optionally and/or selectively stores the instructions and/or the decoded/translated instructions in a cache for subsequent fetching and/or supplying. In some embodiments, the execution portion includes one or more execution units, such as an integer unit or a memory unit.

In a first example embodiment, the instruction supply unit includes a fetch unit and a decode unit. The fetch unit fetches instructions from a memory system and/or from a cache of previously fetched instructions. According to various embodiments, the fetched instructions are decoded by the decode unit into micro-operations and/or into one or more bits used to control an execution pipeline, and the instructions (in the decoded form) are provided to the execution pipeline. The execution pipeline includes an issue unit that issues the decoded instructions for execution. Control of various aspects of the fetch unit and/or of the decode unit is optionally provided by execution modes of the processor.

In a second example embodiment, the instruction supply unit includes a trace unit. In some embodiments, the trace unit fetches instructions from a memory system and/or from a cache. The trace unit translates sequences of one or more instructions into respective traces of operations, and supplies the instructions to an issue unit in the form of the respective traces. The issue unit issues operations of the traces to an execution pipeline for execution. In various embodiments, the trace unit includes a trace cache storing one or more of the traces or portions thereof, and instructions in the form of the respective traces are optionally and/or selectively supplied from the trace cache. Control of various aspects of the trace unit is optionally provided by execution modes of the processor.

In a third example embodiment, the instruction supply unit fetches instructions from a memory system and/or from an instruction cache. The fetched instructions are decoded and/or translated, according to various embodiments, to produce information derived from the fetched instructions. For example, in some embodiments, the derived information is in a form of micro-operations. In further embodiments, the derived information is cached. The derived information is supplied, either directly or via a cache according to various embodiments, to one or more execution units of the processor. In some embodiments, the derived information is supplied, at least in part, as bundles, where each of the bundles includes the derived information of one or more of the instructions. In further embodiments, each of the bundles is associated with a bundle identifier. In still further embodiments, each of the bundles is a trace. Control of various aspects of the processor with respect to each of the bundles is optionally provided by execution modes of the processor. In some embodiments, each of the bundles is associated with a respective execution mode.

In some embodiments, an instruction sequence including one or more instructions is defined as a portion of an instruction stream or as a portion of an instruction image. The instruction sequence has attributes, such as an associated execution mode, that are different from default global attributes used outside of the instruction sequence. In various embodiments, the execution mode defines a set of interrupts that are enabled during execution of the instruction sequence. According to various embodiments, the execution mode controls one or more of the ways a processor fetches, decodes, translates, caches, and issues instructions in an instruction sequence. In further embodiments, when the instruction sequence is executed, the associated execution mode controls, at least in part, execution on the processor. According to various embodiments, when the instruction sequence ends, one or more of: the execution mode reverts to a default mode; the execution mode reverts to a previous mode; the execution mode changes to a post-sequence mode; pending interrupts are taken; and pending events are processed. For example, in some embodiments and/or usage scenarios, the execution mode of the instruction sequence selectively defers any power-management events until the instruction sequence completes. When the instruction sequence completes, hardware is enabled to process any pending power-management events.

According to various embodiments and/or usage scenarios, an instruction sequence is enabled (such as via MSRs and/or other state within or accessed by the processor) to include one or more of: all types of instructions; solely certain types of instructions; and all types of instructions except for certain types of instructions. For example, according to various embodiments, an instruction sequence includes one or more of arithmetic instructions, logical instructions, no-op instructions, branch instructions, jump instructions, call instructions, return instructions, transfer-of-control instructions, any specified one or more instructions, any specified one or more types of instructions, any type of user-mode instruction, any type of supervisor-mode instruction, any other type of instruction, and all types of instructions except for one or more of the foregoing. In some embodiments, processing types of instructions not enabled to be included in the instruction sequence results in the instruction sequence being ignored and/or being aborted and/or an exception being recognized. In other embodiments, effects of processing an instruction sequence (such as using an execution mode of the instruction sequence) are applied solely to the types of instructions enabled to be included in the instruction sequence.

In some embodiments, an instruction sequence is interruptible by certain types of interrupts that are enabled during the execution of the instruction sequence. Interrupting the instruction sequence invokes execution of interrupt handler (also called exception handler) code, and the interrupt handler selectively, upon completion, returns to the instruction sequence. In various embodiments, the interrupt handler runs in a distinct execution mode, such as a privileged or supervisor mode. According to various embodiments, returning from an interrupt to the instruction sequence: resumes execution in the execution mode of the instruction sequence; restores the execution mode to a default global mode; and uses an execution mode specified by the interrupt handler.

In some embodiments, processing of a particular type of instruction is enabled, during execution of an instruction sequence, to be according to an execution mode different from that of the instruction sequence. In further embodiments, the ability of the processing of the particular type of instruction to be according to the different execution mode and/or a definition of the different execution mode are optionally and/or selectively controllable through MSRs. For example, in some embodiments, processing of a particular type of no-op instruction is enabled to optionally and/or selectively allow one or more types of interrupts to be taken during execution of an instruction sequence, even if an execution mode of the instruction sequence disables the one or more types of interrupts. When the particular type of no-op instruction is encountered during execution of the instruction sequence, one or more pending interrupts of the one or more types of interrupts are optionally and/or selectively recognized, and when interrupt processing completes, the instruction sequence is resumed.

In some embodiments, an instruction sequence is defined via a start-instruction-sequence code in the instruction stream, along with an associated instruction sequence definition. In some embodiments, the start-instruction-sequence code is an instruction prefix. In other embodiments, the start-instruction-sequence code is a type of instruction, such as a conditional no-op. According to various embodiments, the instruction sequence definition includes one or more of: information specifying a start of the instruction sequence; information specifying an end of the instruction sequence; and other information such as an execution mode for the instruction sequence. According to various embodiments, each of the start and/or the end of the instruction sequence is provided as one or more of: an instruction address; an instruction count relative to the start of the instruction sequence; an offset relative to the start-instruction-sequence code; a dynamic instruction count; and an execution time (such as a time measured in clock cycles). In some embodiments, an execution path of the instruction sequence determines the instructions that are part of the instruction sequence on any given execution.

In some embodiments, the instruction sequence definition is in-line in the instruction stream after and/or as a part of a start-instruction-sequence code. In other embodiments, a start-instruction-sequence code in the instruction stream specifies a pointer to the instruction sequence definition. For example, in various embodiments, the instruction sequence definition is provided at least in part by one of n sets of machine-state registers, and the pointer includes a number from one to n indicating the set of machine-state registers used to provide the instruction sequence definition.

In some embodiments, the instruction sequence follows the start-instruction-sequence code at a defined offset, such as a relative location. In other embodiments, the instruction sequence definition provides information as to the beginning location of the instruction sequence, such as an absolute location.

In some embodiments, a start-instruction-sequence code in the instruction stream defines a beginning instruction of an instruction sequence, and an end-instruction-sequence code in the instruction stream defines an ending instruction. In some embodiments, the end-instruction-sequence code is a static (program-flow independent) indication of the end of the instruction stream. In other embodiments, the end-instruction-sequence code is a dynamic (program-flow dependent) indication of the end of the instruction stream, and there are optionally multiple end-instruction-sequence codes associated with one instruction sequence, enabling the instruction sequence to terminate in multiple ways depending on an execution path of the instruction sequence. In some embodiments and/or usage scenarios, an instruction sequence definition provides information about locations of a beginning and an ending instruction in an instruction sequence, and an end-instruction-sequence code optionally enables the instruction sequence to dynamically terminate at a point prior to the ending instruction.

In some embodiments, an instruction sequence is defined by writing one or more machine-state registers, where at least a portion of the values of the machine-state registers compose an instruction sequence definition. According to various embodiments, machine-state registers are used to specify one or more of: a start of the instruction sequence; an end of the instruction sequence; a start and/or an end of a span of memory, where the instruction sequence includes all instructions in and/or wholly contained within the span of memory; a length of the instruction sequence in instructions; a length of the instruction sequence in bytes; a length of the instruction sequence in traces; and other information such as an execution mode of the instruction sequence.

In some embodiments, machine-state registers and/or other state within or accessed by the processor specify a span of memory, and an instruction sequence is defined as all instructions in and/or wholly contained within the span of memory. For each transfer of control into the span of memory from outside of the span of memory, a respective start of the instruction sequence (or starting instruction or starting instruction location) is specified by the destination of the transfer of control, and a respective end of the instruction sequence (or terminating instruction or terminating instruction location) is defined by a last instruction executed in and/or wholly contained within the span of memory prior to an instruction executed outside of the span of memory.

In some embodiments, an instruction sequence is defined by a combination of a start-instruction-sequence code and associated in-line information, and one or more machine-state registers and/or other state within or accessed by the processor (such as a segment descriptor, a page table entry, or a page descriptor entry) that has been written and/or set prior to the encountering of the start-instruction-sequence code in the instruction stream. In a first example, in some embodiments, a start-instruction-sequence code specifies one of n sets of machine-state registers, each set providing at least a portion of an execution mode definition. In a second example, in some embodiments, at least some aspects of the processor are controllable through other state within or accessed by the processor. Each of a plurality of code and/or data segment descriptors is associated with a controllable aspect of the processor, such as whether code and/or data associated with the segment descriptor is cacheable. Cacheability of the code and/or of the data is controlled depending on which one of the code and/or data segment descriptors is used to retrieve the code and/or the data. An instruction sequence that is accessed via a particular code segment descriptor has an execution mode based, at least in part, on aspects of the processor controlled via the particular code segment descriptor.

In some embodiments, multiple sets of machine-state registers, each set including at least a portion of an instruction sequence definition, are supported, enabling multiple instruction sequences to be concurrently defined. In various embodiments, each set of machine-state registers includes information indicating the location of one or more instruction sequences. In other embodiments, other mechanisms are used to select one of the sets of machine-state registers to provide an execution mode for an instruction sequence. For example, in various embodiments, instruction sequence definitions are defined in part by translation look-aside buffer entries, or through referencing instructions via specific code segments. In some embodiments, a particular translation look-aside buffer entry (or a specific code segment) includes or is otherwise associated with a pointer to an execution mode definition, and executing code identified through the particular translation look-aside buffer entry (or the specific code segment) uses the associated execution mode. In some embodiments and/or usage scenarios, the pointer to the execution mode definition is implemented as a value from 0 to n−1, specifying one of n sets of machine-state registers containing execution mode settings.

In some embodiments, an instruction sequence is specified by an instruction sequence definition, and the instruction sequence definition includes an execution mode offset, such as an offset measured in bytes, in instructions, and/or in traces. An execution mode associated with the instruction sequence definition takes effect at a location in the instruction sequence specified by the execution mode offset. In various embodiments, the execution mode offset is, or defaults to, zero, and the execution mode takes effect at a start of the instruction sequence.

In some embodiments, an instruction sequence is specified by an instruction sequence definition, and the instruction sequence definition includes a sequence offset, such as an offset measured in bytes, in instructions, and/or in traces. The sequence offset modifies determination of a beginning instruction of the instruction sequence. In a first example, the instruction sequence is specified, at least in part, by a start-instruction-sequence code in the instruction stream, and if the sequence offset is zero, the instruction sequence starts immediately following the start-instruction-sequence code. If the sequence offset is non-zero, then the start of the instruction sequence is delayed by a number of bytes, instructions, and/or traces, as specified by the sequence offset. In a second example, the instruction sequence definition is provided, at least in part, by machine-state registers, and the instruction sequence starts at a location determined, at least in part, via the sequence offset and when a particular one of the machine-start registers enabling the particular instruction sequence definition is set. Continuing the second example, if the sequence offset was four traces, then once the instruction sequence definition is enabled, the fourth dynamically following trace is the instruction sequence associated with the instruction sequence definition.

In some embodiments, an instruction supply unit includes a control circuit enabled to determine a start of an instruction sequence in an instruction stream. According to various embodiments, the control circuit determines the start of the instruction sequence via one or more of: a start-instruction-sequence code in the instruction stream; and information in machine-state registers. In further embodiments, the control circuit is additionally enabled to determine an end of the instruction sequence. In still further embodiments, the control circuit is enabled to change a current execution mode of the processor in response to determining the start and/or the end of the instruction sequence.

In some embodiments, an execution unit includes a control circuit enabled to determine a start of an instruction sequence in an instruction stream. According to various embodiments, the control circuit determines the start of the instruction sequence via one or more of: a start-instruction-sequence code in the instruction stream; information in machine-state registers; and information provided from prior pipeline stages, such as information from an instruction supply unit. In further embodiments, the control circuit is additionally enabled to determine an end of the instruction sequence. In still further embodiments, the control circuit is enabled to changes a current execution mode of the processor in response to determining the start and/or the end of the instruction sequence.

According to various embodiments, a processor encountering and/or executing a start-instruction-sequence code (or a beginning instruction of an instruction sequence) changes a current execution mode of the processor to another execution mode provided by an associated instruction sequence definition. In some embodiments and/or usage scenarios, transferring control (such as by a branch instruction, a jump instruction, a call instruction, or a return instruction) into the middle of an instruction sequence, thus skipping a start-instruction-sequence code (and/or a beginning instruction), does not change a current execution mode of the processor. In some embodiments, transferring control (such as by a branch instruction, a jump instruction, a call instruction, or a return instruction) into a range of instructions spanning an instruction sequence or a span of memory, even if a start-instruction-sequence code (and/or a beginning instruction) is skipped, changes a current execution mode of the processor to another execution mode provided by an instruction sequence definition associated with the instruction sequence.

In some embodiments, encountering a start-instruction-sequence code in the instruction stream changes a current execution mode of the processor to another execution mode provided by an instruction sequence definition, but does not do so immediately. In further embodiments, the start-instruction-sequence code inserts an execution delay sufficient for an execution mode change to take effect. In various embodiments, an instruction supply unit delays further instruction supplying after encountering a start of an instruction sequence in order for any execution mode changes to take effect. In various embodiments, a start or an end of an instruction sequence is a trace boundary.

In various embodiments, encountering and/or executing an ending instruction in an instruction sequence changes a current execution mode to another execution mode, such as a post-sequence execution mode or a default global mode. In some embodiments, branching out of a range of instructions spanning an instruction sequence or a span of memory, even if an ending instruction is skipped, changes a current execution mode to another execution mode. In some embodiments and/or usage scenarios, executing an end-instruction-sequence code changes a current execution mode to another execution mode. In various embodiments, an end-instruction-sequence code provides a post-sequence execution mode for the processor. In various embodiments, an end-instruction-sequence code does not have to be an ending instruction in an instruction sequence, and multiple instances of the end-instruction-sequence code optionally appear in the instruction sequence.

According to various embodiments, an instruction sequence ends (and use of a particular execution mode of the instruction sequence during processing stops) due, at least in part, to encountering and/or executing one or more of: an end of the instruction sequence (such as a final location of the instruction sequence); an instruction ending the instruction sequence; an end-instruction-sequence code; and a maximum number of bytes, instructions, traces, and/or any other observable statistic. In some embodiments, when an instruction sequence ends due to exceeding a maximum number of one or more observable statistics, an exception is recognized. According to various embodiments, the final location of the instruction sequence is specified by one or more of: one or more machine-state registers and/or other state within or accessed by the processor; and an offset relative to a start of the instruction sequence. In some embodiments, an execution mode of an instruction sequence remains in effect until the instruction sequence ends, even if there is a transfer of control outside of a span of the instruction sequence. For example, a call instruction transfers control outside of the span, and instructions at a target of the call instruction are processed according to the execution mode.

In some embodiments, one or more machine-state registers specify at least a portion of an execution mode of a processor. In various embodiments, the execution mode includes interrupt enable/disable controls, enabling a specified subset of possible interrupt types to be taken if an interrupt event occurs. In some embodiments and/or usage scenarios, an interrupt type that is not enabled when the respective interrupt event occurs is held pending until the interrupt type is enabled. In some embodiments, types of interrupts that are controllable include one or more of non-maskable interrupts, system-management interrupts, power-management interrupts, and I/O interrupts. In various embodiments, some or all features controllable with an execution mode are solely effective in a privileged mode, such as a supervisor mode, and attempts to control the features when not in an appropriately privileged mode are ignored. According to various embodiments, attempting to control a privileged feature when not sufficiently privileged results in one or more of: an exception being taken; and the attempt to control the privileged feature being ignored.

In some embodiments and/or usage scenarios, instruction sequences optionally overlap and/or are optionally nested (where an inner instruction sequence is contained within an outer instruction sequence). For example, each of multiple sets of machine-state registers provides an instruction sequence definition, leading to a possibility that two instruction sequences are nested or overlap. In another example, a set of machine-state registers provides an instruction sequence definition, and the span of memory specified by the instruction sequence definition contains an in-line definition of an instruction sequence. In some embodiments, attempting to define nesting and/or overlapping instruction sequences causes an exception. In some embodiments, encountering nesting and/or overlapping instruction sequences during execution causes an exception. In various embodiments, nesting and/or overlapping instruction sequences have a defined architectural behavior, such as ORing respective execution modes of the nesting and/or overlapping instruction sequences when executing instructions in a nested and/or overlapped region. In some embodiments and/or usage scenarios, nesting and/or overlapping instruction sequences are resolved by choosing an execution mode of one of the instruction sequences. For example, if an instruction sequence definition of one of the instruction sequences is associated with an execution mode of a higher privilege level than another, the higher-privilege level definition is chosen. In another example, nesting and/or overlapping instruction sequences are resolved in an architecturally defined order based, at least in part, on respective instruction sequence definitions, such as "MSR overrides in-line", or "an earlier set of MSR definitions overrides a later set" (according to dynamic program order). In some embodiments where two instruction sequences are nested, forming an inner instruction sequence and a surrounding outer instruction sequence, completing execution of the inner instruction sequence results in reverting an execution mode from an inner execution mode of the inner instruction sequence to an outer execution mode of the outer instruction sequence. In various embodiments, a number of instruction sequences that can be nested is limited by a maximum value. In various embodiments, one of multiple ways of resolving nested and/or overlapped instruction sequences is selected, depending on a combination of types of respective instruction sequence definitions, privilege levels of the respective instruction sequence definitions, a current privilege level of the processor, and one or more MSR control bits.

In some embodiments, an execution mode includes settings that enable processor features, such as controls for different modes of operation. According to various embodiments, an execution mode setting is used for one or more of: to enable super-scalar operation; to enable branch prediction; to control behavior of an instruction scheduler, thus controlling a way that instructions are sent down a processor pipeline; and to enable different modes of operation, such as fully parallel, or one instruction at a time, or one-trace-at-a-time. According to various embodiments, an execution mode includes one or more of: controls over a memory hierarchy, such as whether certain levels or types of caches are enabled and/or bypassed, or whether cache coherency is active and/or is considered, or whether a processor is in a write-through mode; settings controlling debug execution modes of the processor; and an atomic sequence enable.

In some embodiments, features and capabilities of an instruction sequence are determined by machine-state registers. In some embodiments, some or all machine-state registers are solely writable by privileged instructions. In various embodiments, an instruction sequence definition describes features and capabilities for the instruction sequence that override those in machine-state registers. In some embodiments and/or usage scenarios, any override specified by an instruction sequence definition is bound by limits provided in machine-state registers. For example, a machine-state register specifies a maximum number of cycles for execution of any one instruction sequence, and a particular instance of an instruction sequence provides, in an instruction sequence definition, a smaller value for the maximum number of cycles. According to various embodiments, a specification of a larger value for the maximum number of cycles in an instruction sequence definition than is specified in a machine-state register: causes an exception; and/or results in use of a smaller of the two values as the maximum number of cycles.

In some embodiments, MSRs optionally and/or selectively specify constraints (such as a maximum allowable number of instructions executed during execution) on the instruction sequence and/or record information relating to execution (such as a number of instructions executed during execution) of the instruction sequence. According to various embodiments, the constraints specified and/or the information recorded include one or more of: a number of cycles; a number of instructions; a number of micro-operations; a number of branches; a number of jumps; a number of calls; a number of traces; and any other statistic of behavior of the processor. In various embodiments, MSRs record a starting instruction location and/or a terminating instruction location of the instruction sequence.

In some embodiments, some features and capabilities of an instruction sequence vary according to a mode (such as a privilege mode) of a processor. For example, in various embodiments there is one set of capabilities, such as a maximum number of cycles for an instruction sequence, provided for user mode, and a second set of capabilities provided for supervisor mode. As another example, in some embodiments supervisor mode instruction sequences are enabled to execute privileged instructions while user mode instruction sequences are not.

In various embodiments, different portions of machine-state registers specify some or all of the execution mode settings for a processor. For example, a first machine-state register specifies interrupt settings, while a second machine-state register specifies enablement of out-of-order execution. For another example, a single machine-state register specifies both interrupt settings and enablement of out-of-order execution. Any portion of execution mode settings are specified by any number and arrangement of machine-state registers according to various embodiments.

In some embodiments, a capability to define or to execute an instruction sequence is limited to privileged (e.g., supervisor) code. In various embodiments, one or more machine-state registers control which processor privilege modes (such as user or supervisor) are enabled to define or to execute an instruction sequence. In some embodiments and/or usage scenarios, an instruction sequence is defined in one mode, such as supervisor mode, and is executed in another mode, such as user mode. In various embodiments, instruction sequences in some privilege modes are not enabled to control all of the execution modes. For example, in some embodiments, an instruction sequence executed in user mode is not enabled to disable power-management interrupts, whereas an instruction sequence executed in supervisor mode is so enabled. In various embodiments, machine-state registers writable in a privileged mode, such as supervisor mode, control the instruction sequence execution mode capabilities available at different privilege levels.

In some embodiments, a combination of one or more machine-state registers and an instruction sequence definition define an instruction sequence as an atomic sequence that is not interruptible. In some embodiments, an atomic instruction sequence is solely interruptible by a power-management event (and not by other events). In some embodiments, a user-mode atomic instruction sequence is interruptible by a power-management event, but a supervisor-mode atomic instruction sequence is not interruptible by a power-management event. In some embodiments, the set of interrupts that are enabled to interrupt a user-mode atomic instruction sequence is defined by a machine-state register that is writable in a privileged mode.

In some embodiments and/or usage scenarios, a non-interruptible instruction sequence is not fully atomic in that certain events, such as power-management events, are optionally enabled to interrupt the sequence. In various embodiments, a machine-state register records a list of one or more events that occurred during (and optionally interrupted) an instruction sequence. In some embodiments, a list of zero or more events that occurred during (and optionally interrupted) an instruction sequence is available as a condition code when the instruction sequence completes. In various embodiments, a condition code available when the instruction sequence completes indicates that the instruction sequence was interrupted.

In some embodiments, a machine-state register records an elapsed time that an instruction sequence has executed. In various embodiments, reading the elapsed time machine-state register after an instruction sequence completes provides an elapsed time used by the instruction sequence, such as from a starting instruction through a terminating instruction. According to various embodiments, the elapsed time is measured in one or more of clock cycles, native instruction count, and microcode instruction count.

In some embodiments, an exception (such as an instruction fault or a page fault) during execution of an instruction in a user-defined instruction sequence is treated similarly to an exception during execution of an instruction not in a user-defined instruction sequence, and a program counter (address) of a failing instruction is reported. In some embodiments, an exception during execution of an instruction sequence changes a current execution mode from an in-sequence execution mode to an exception execution mode. In various embodiments, exceptions are returned from and the instruction sequence is resumed. In some embodiments, the occurrence of an exception during execution of an instruction sequence is recorded in a machine-state register for accessing during execution of the instruction sequence and after completion of the instruction sequence.

In some embodiments, an exception (such as an instruction fault or a page fault) during execution of an instruction sequence is treated as if the instruction sequence were an atomic unit, and the program counter of a beginning instruction in the instruction sequence (or a next instruction immediately following the end of the instruction sequence) is reported. In various embodiments, an exception during execution of an instruction in a user-defined instruction sequence aborts a trace representing the instruction sequence. In some embodiments, an aborted trace is re-issued in a different execution mode. According to various embodiments, a machine-state register controls exception-reporting for instruction sequences and selects among options such as exception-reporting a failing instruction, or exception-reporting a failing instruction sequence as a whole. In various embodiments, the selection of the manner of exception-reporting for instruction sequences is an execution mode.

In some embodiments, stores into an instruction stream that change an instruction sequence without changing an instruction sequence definition affect instructions executed by the instruction sequence, but not an execution mode of the instruction sequence. According to various embodiments, stores into an instruction stream that change an instruction sequence definition result in one or more of: the instruction sequence no longer being defined (such as by overwriting a start-instruction-sequence code); and more or fewer instructions being in the instruction sequence (such as by altering an instruction count parameter). For example, a store into an instruction stream that alters an instruction sequence definition changes a mode of execution associated with the instruction sequence (such as by overwriting an execution mode parameter). In various embodiments that cache decoded instructions, stores into an instruction stream that change an instruction sequence definition or the instruction sequence itself cause one or more cached decoded instructions associated with the instruction sequence to be invalidated. In various embodiments that use a trace unit, stores into an instruction stream that change an instruction sequence definition or the instruction sequence itself cause a cached trace associated with the instruction sequence to be wholly or partially invalidated.

In some embodiments, an instruction sequence is recorded as a trace. In further embodiments, an instruction sequence is recorded as an atomic trace. In some embodiments, an atomic trace combines effects of multiple instructions from an original sequential program or sequence of instructions. In some embodiments, operations within an atomic trace are optimized (such as by splitting, combining, reorganizing, predictively evaluating, and so forth), and existence of a straightforward mapping from each operation in the trace to an instruction in the original program is not guaranteed. In various embodiments, operations optionally and/or selectively appear in a different order in the trace than their corresponding instructions in the original program, and operations optionally and/or selectively execute in the processor in a different order than they appear in the trace.

In some embodiments, operations in a trace are tentatively (or speculatively) executed based on one or more assumptions, such as a predicted direction of branch instructions. If one or more of the assumptions are incorrect, then the trace is aborted, i.e. the effects of the operations in the trace are undone. In various embodiments, a number of events optionally and/or selectively trigger a trace to be aborted. According to various embodiments, and depending on the event, one or more of: the trace is re-executed with different execution constraints/assumptions; the trace is re-executed with a different execution mode; the trace is modified, such as by being split into multiple traces, prior to being re-executed; and a different trace is executed instead of or prior to the trace. In some embodiments, a correct abort trigger is detected to resolve the event causing the abort.

In some embodiments, an execution mode of a processor includes controls specifying the way or ways a trace is interpreted, translated, and/or optimized as a part of execution of the trace. For example, in various embodiments, the execution mode includes control over whether a trace is provided from a trace cache, or from which of several trace caches the trace is provided. In another example, in some embodiments, the execution mode includes control over the presence of or types of optimizations performed on the instructions in a trace. In various embodiments, a first execution of a trace executes in a first execution mode (such as a translate-on-the-fly mode), and a subsequent execution of the trace executes in a second execution mode (such as a trace-cached mode). In some embodiments, a first translation of a trace assumes memory references are not to I/O space, and subsequent execution of the trace is enabled to disprove that assumption, causing the trace to be re-translated. In various embodiments, an instruction sequence is implemented as a user-defined trace, wherein a respective instruction sequence definition provides programmatic control over at least a portion of the execution mode used for the trace. For example, according to various embodiments, the execution mode of an instruction sequence provides control over one or more of: assumptions used in the translation of the trace; whether the trace is cached; in which of several caches the trace is stored; whether the trace is evictable from a cache; and other similar controls.

In some embodiments, a trace unit translates a trace of instructions into an internal format, and issues translated instructions along with a corresponding trace ID. According to various embodiments, the translation is produced by one or more of: hardware; software; and a combination of hardware and software. According to various embodiments, the translation is performed as one or more of: on-the-fly as instructions are fetched; and a background process. In various embodiments, the use of a trace cache storing translated traces enables translation to be performed as a background process involving optimizations. In some embodiments, a warm trace cache (such as a basic block cache) stores a simple translation performed on-the-fly (or nearly so), and a hot trace cache (such as a multi-block cache) stores a more optimized translation produced as a background process. In some embodiments and/or usage scenarios, a first execution of a trace is enabled to reveal properties of the trace, such as referencing I/O memory, that affect a subsequent translation of the trace. In various embodiments, the different modes of trace translation and fetching are also execution modes that are controllable per instruction sequence using the teachings herein. In some usage scenarios, for diagnostic and/or debug reasons, there is a benefit from providing per-instruction-sequence control over trace translation and fetching modes, such as the way a translation is produced, the cache used to provide a given translated trace, and similar properties affecting the execution of instructions. In some embodiments, debug execution modes provide control of diagnostic and/or debug features of the processor.

In some embodiments, a trace unit defines trace boundaries in an instruction stream, translates the instructions within a trace into an internal format, and issues translated instructions along with a corresponding trace ID. In some embodiments, trace boundaries are basic block boundaries. In further embodiments, a trace optionally includes one or more basic blocks. In various embodiments, knowledge about a trace from previous executions of the trace selectively enables the trace to be broken into multiple, separate traces, or selectively enables multiple, separate traces to be combined. In various embodiments, knowledge about a trace from previous executions selectively changes a way that the trace is translated for a subsequent execution. In some embodiments and/or usage scenarios, an instruction sequence is processed by the trace unit and is treated as one or more traces, with the instruction sequence boundaries being trace boundaries. In various embodiments, an in-line instruction sequence definition, such as via a start-instruction-sequence code in the instruction stream, is treated as a separate trace, resulting in a trace boundary prior to the defined instruction sequence itself. In some embodiments, all traces have execution modes, and instruction sequences are a mechanism to provide instruction-level control over the boundaries and the execution modes of traces.

In some embodiments, a trace unit translates a trace of instructions into an internal format, and issues translated instructions along with a corresponding trace ID to a plurality of processor cores. In various embodiments, all of the cores are identical, or alternatively at least one of the cores is unique. In some embodiments, an execution mode includes controls for a set of cores that are enabled to execute a given trace. For example, in some embodiments, an instruction sequence definition specifies, either directly or through one or more referenced MSRs, that a corresponding instruction sequence is solely executable on a specified subset of a plurality of cores.

In some embodiments and/or usage scenarios, a first application is enabled to indirectly observe behavior of a second application. For example, the first application executes a large number of conditional branches to flood a branch prediction table, and measures latencies of the conditional branches. From the branch latencies, information about branch behavior of the second application is determined. In some usage scenarios, it is desirable to execute the second application without revealing information about execution of the second application to other applications. In some embodiments and/or usage scenarios, the second application includes one or more user-defined instruction sequences that prevent some or all execution details of the instructions sequences from being visible to other applications. In a first example, a critical portion of the second application is specified as a user-defined instruction sequence so that the entire critical portion executes as a single trace, and thus conditional branches in the critical portion are predicted during translation of the trace, and side effects of the conditional branches are not visible to other applications. In a second example, a critical portion of the second application is specified as a user-defined instruction sequence that executes in an execution mode with branch prediction, such as history-based branch prediction, disabled, and thus side effects of the conditional branches are not visible to other applications. In various embodiments, when branch prediction is disabled, branches are predicted using a branch prediction model, such as static branch prediction. In similar ways, other side effects of execution of the second application, such as effects on data caches, are controllable using user-defined instruction sequences to render the side effects unobservable to other applications.

System

FIG. 1 illustrates selected aspects of an embodiment of a processor that processes (such as any one or more of fetching, decoding, issuing, and executing) user-defined instruction sequences according to an execution mode. Processor 101 includes Instruction Supply Unit (ISU) 102, Cores 103.1 to 103.N, Floating Point unit (FP) 105, and Level 2 Cache (L2) 104. In some embodiments, an instruction supply unit (such as ISU 102) is shared by one or more of the cores. In some embodiments, each of at least some of the cores has a respective instruction supply unit.

Instruction Supply Unit (ISU) 102 is supplies instruction traces to the cores. In some embodiments, Instruction Supply Unit (ISU) 102 fetches instructions for the cores, decodes and/or translates the fetched instructions into an internal format, and provides the decoded/translated instructions as traces to the cores. In some embodiments, Instruction Supply Unit (ISU) 102 includes a fetch unit and a decode unit. In other embodiments, Instruction Supply Unit (ISU) 102 includes a trace unit, and the trace unit includes one or more trace caches storing pre-translated versions of instructions. In various embodiments, Instruction Supply Unit (ISU) 102 includes a control circuit enabled to determine a start and/or an end of an instruction sequence in an instruction stream.

Each of the Cores 103.1 to 103.N includes respective integer and memory units, as illustrated by Integer Unit (IU) 116 and Memory Unit (MU) 117 included in Core 103.1. Each of the cores optionally includes various abort processing logic, as illustrated by Abort Unit 118. The processor also contains one or more machine-state registers controlling operation of the processor and reporting status of the processor, as illustrated by MSRs 119 and MSRs 129. In various embodiments, the MSRs are located in, and are responsive to, various portions of the processor, and are drawn in one of the cores and in the ISU for purposes of illustration. The cores are coupled to the ISU and the L2. In some embodiments, solely a portion of the cores are coupled to the FP (as illustrated with respect to Core 103.N). In other embodiments, all of the cores are coupled to the FP. In some embodiments, the cores are identical, while in other embodiments some of the cores are of one type (having, for example, relatively high instruction processing bandwidth and capable of operating at a relatively high frequency), and some of the cores are of another type (having relatively low processing bandwidth and frequency). In some embodiments, all or portions of the Abort Unit are implemented in the IU, the MU, or both. The number and processing capabilities of the cores vary without restriction, according to various embodiments.

In some embodiments, an external storage device, such as disk 174 illustrated in FIG. 1, is coupled to processor 101 to provide storage for programs such as object code 175, and optionally for data (not explicitly illustrated). Object code 175 contains a sequence of instructions, such as an instruction image. In some embodiments, object code 175 contains an instruction sequence 142, surrounded by preceding instructions 132 and following instructions 152. In some embodiments, instruction sequence 142 is identified via a Start Instruction Sequence (SIS) code specifying an instruction sequence definition 140. In some embodiments, instruction sequence definition 140 indicates the extent of instruction sequence 142, and/or an execution mode for the instruction sequence.

FIG. 2A illustrates examples of machine-state registers for controlling user-defined instruction sequence processing (such as any one or more of fetching, decoding, issuing, and executing). In some embodiments, machine-state registers 210 include one or more individual registers, the registers including one or more fields, each of the fields alone or in combination controlling or reporting an aspect of operation of a processor. In various embodiments, any combination of MSRs 119 and MSRs 129 of FIG. 1 are instances or variations of all or portions of machine-state registers 210. In some embodiments, machine-state registers contain fields such as Max Instructions 211, specifying a maximum number of instructions an instruction sequence is enabled to execute, and Max Cycles 212, specifying a maximum number of clock cycles an instruction sequence is enabled to execute. According to various embodiments, machine-state registers contain one or more fields such as Feature Enables 213, Debug Features 214, Activity Suppression 215, Fetch Controls 216, Trace Controls 217, Atomic Sequence Enable 218, and Instruction Sequence Enable 219. In some embodiments, there are different sets of some or all of machine-state registers 210 for different modes of operation of the processor, such as one set for supervisor mode, and another set for user mode. In some embodiments, there are different sets of some or all of machine-state registers 210 for use by different instruction sequences, where an instruction sequence definition specifies the set of machine-stage registers to be used for a corresponding instruction sequence.

According to various embodiments, Fetch Controls 216 provides control over one or more of: a manner of fetching instructions or instruction sequences (such as cached or uncached); caching of fetched instructions; retrieval of the cached instructions; and other similar controls. According to various embodiments, Trace Controls 217 provides control over one or more of: translation of instructions or instruction sequences; caching of resulting translations; retrieval of the cached translations; and other similar controls. In some embodiments, Activity Suppression 215 disables (or enables) events, controlling whether those events are enabled to interrupt an instruction sequence. In some embodiments, Atomic Sequence Enable 218 enables the atomic execution of instruction sequences. In some embodiments, Instruction Sequence Enable 219 enables the recognition of a start-instruction-sequence code used to introduce an instruction sequence and/or enables one or more machine-state registers to specify an instruction sequence. In various embodiments, Feature Enables 213 and Debug Features 214 control operation and behavior of the processor. In some embodiments, Debug Features 214 controls execution modes that aid in isolating bugs in hardware and/or software. For example, in various embodiments, Debug Features 214 controls modes such as superscalar (vs. single-instruction-at-a-time) execution, whether trace optimization is enabled, what levels of cache hierarchy are active, and other similar modes.

FIG. 2B illustrates selected details of an embodiment of a user-defined instruction sequence definition. Instruction sequence definition 220 includes information to, at least in part, define an instruction sequence. In various embodiments, instruction sequence definition 140 of FIG. 1 is an instance of variations of all or portions of instruction sequence definition 220. In some embodiments, an instruction sequence definition is provided in-line in an instruction stream after a start-instruction-sequence code. In some embodiments, an instruction sequence definition is provided by writing to one or more machine-state registers that include the instruction sequence definition. In some embodiments, there are multiple sets of machine-state registers containing instruction sequence definitions, enabling multiple instruction sequences to be defined in parallel. In some embodiments, an instruction sequence definition is provided by a combination of a portion of the definition in-line in an instruction stream, and a portion of the definition provided by contents of one or more machine-state registers.

As illustrated in FIG. 2B, instruction sequence definition 220 includes instruction sequence start 221, instruction sequence end 222, execution mode 223, and machine-state register overrides 224. In some embodiments, instruction sequence start 221 is specified as a program counter value. In some embodiments, instruction sequence end 222 is specified as a program counter value. In other embodiments, instruction sequence end 222 is specified as an offset relative to instruction sequence start 221. In various embodiments, execution mode 223 specifies an execution mode of a processor when processing (such as any one or more of fetching, decoding, issuing, and executing) the defined instruction sequence. In some embodiments, machine-state register overrides 224 specify values to be used instead of values contained in machine-state registers when executing the defined instruction sequence. In some embodiments, machine-state register overrides 224 specify one of n sets of machine-state registers to be used to override global machine-state registers to control the execution mode of the defined instruction sequence. In some embodiments and in some usage scenarios, execution mode 223 and/or machine-state register overrides 224 are wholly or partially ignored in lieu of values in machine-state registers that are not override-able. For example, in some embodiments, an instruction sequence definition specifies a maximum number of cycles larger than a value in an implementation-dependent maximum cycles machine-state register; and the value in the implementation-dependent maximum cycles machine-state register overrides the maximum number of cycles in the instruction sequence definition.

Figure 3A:
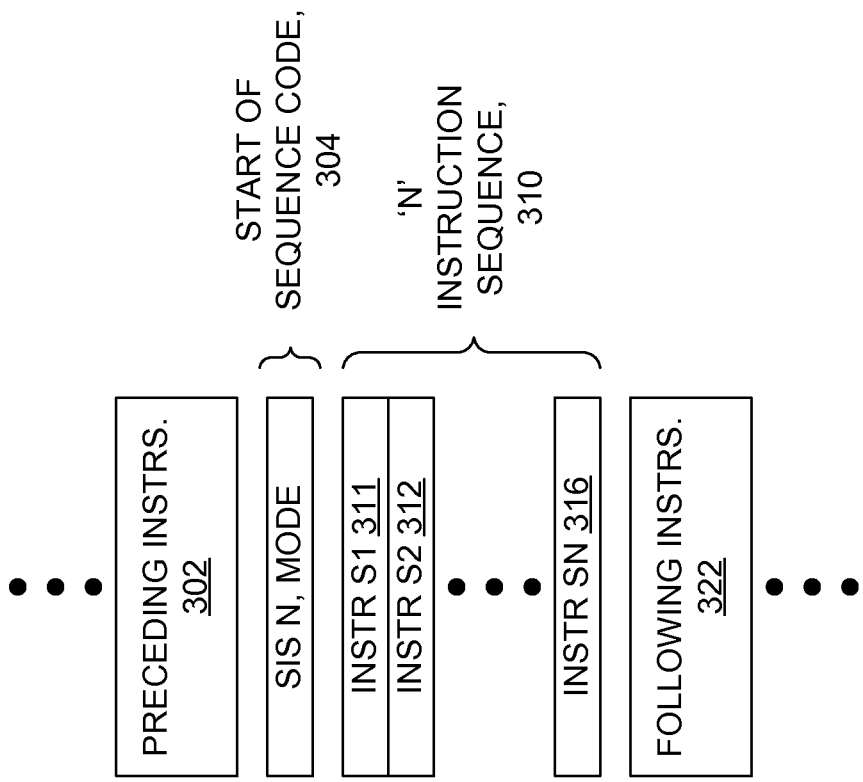
FIG. 3A illustrates selected details of an embodiment of a user-defined instruction sequence in an instruction stream, the user-defined instruction sequence indicated by a start-instruction-sequence code.

FIG. 3A illustrates selected details of an embodiment of a user-defined instruction sequence in an instruction stream, the user-defined instruction sequence indicated by a start-instruction-sequence code that specifies a number of instructions in and an execution mode for the sequence. Instruction sequence 310 is preceded by preceding instructions 302, and is followed by following instructions 322. Instruction sequence 310 starts with beginning instruction S1 311, and continues through ending instruction Sn 316. In some embodiments, the instruction sequence is defined by start of sequence code 304. In some embodiments, start of sequence code 304 takes a form of an instruction, such as an "SIS n, mode" instruction, as illustrated in FIG. 3A. For example, the "SIS n, mode" instruction illustrated has two arguments: a number of instructions in the following instruction sequence, and a specification of an execution mode for the instruction sequence. In some embodiments, start of sequence code 304 is in a form of an instruction prefix applied to beginning instruction S1 311. In some embodiments, start of sequence code 304 is in a form of an instruction type, such as a conditional no-op. In various embodiments, start of sequence code 304 includes information indicating and/or specifying where the beginning instruction in the instruction sequence is in the instruction stream, where the ending instruction in the instruction sequence is in the instruction stream, and other properties associated with the instruction sequence, such as an execution mode. In some embodiments, the value 'n' in the "SIS n, mode" instruction is implicit and is not encoded in the instruction; in related embodiments, there are multiple versions of the "SIS n, mode" instruction, each having a different implicit value for 'n'.

Figure 3B:
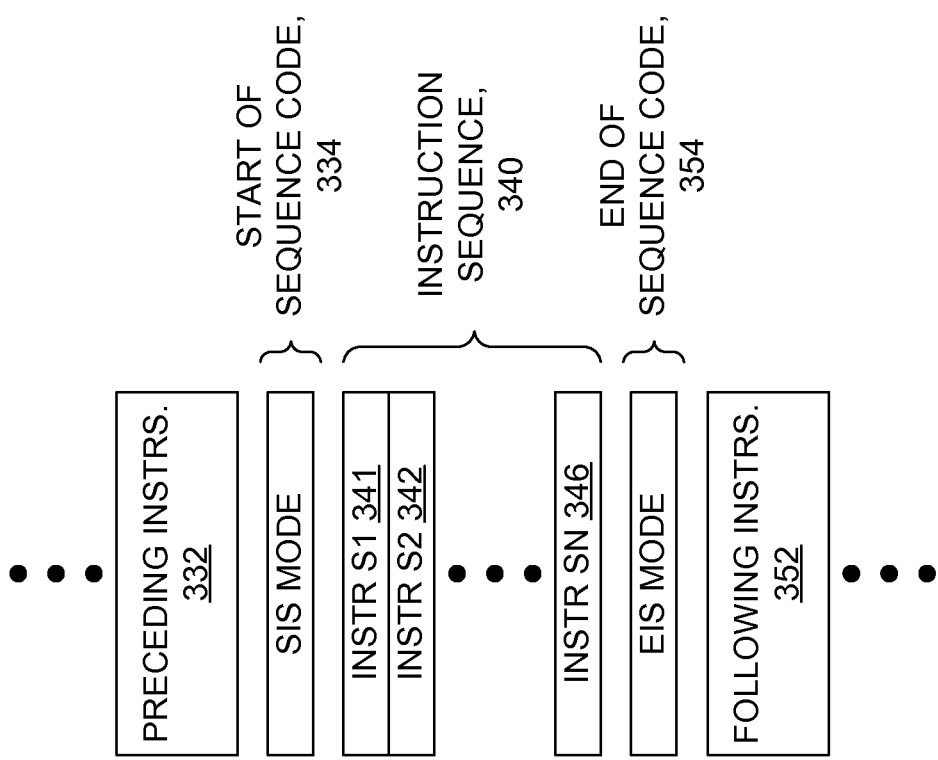
FIG. 3B illustrates selected details of an embodiment of a user-defined instruction sequence in an instruction stream, the instruction sequence indicated by start-instruction-sequence and end-instruction-sequence codes.

FIG. 3B illustrates selected details of an embodiment of a user-defined instruction sequence in an instruction stream, the instruction sequence indicated by a start-instruction-sequence code (that specifies an execution mode for the sequence) and an end-instruction-sequence code. Instruction sequence 340 is preceded by preceding instructions 332, and is followed by following instructions 352. Instruction sequence 340 starts with beginning instruction S1 341, and continues through ending instruction Sn 346. In some embodiments, the instruction sequence is defined by start of sequence code 334, and is terminated by end of sequence code 354. In some embodiments, start of sequence code 334 takes a form of an instruction, such as an "SIS mode" instruction, as illustrated in FIG. 3B. For example, the "SIS mode" instruction illustrated has one argument: a specification of an execution mode for the instruction sequence. In some embodiments, start of sequence code 334 is in a form of an instruction prefix applied to beginning instruction S1 341. In some embodiments, start of sequence code 334 is in a form of an instruction type, such as a conditional no-op. In various embodiments, start of sequence code 334 includes information indicating and/or specifies where the beginning instruction in the instruction sequence is in the instruction stream, and other properties associated with the instruction sequence, such as an execution mode. In various embodiments, the instruction sequence includes the instructions between start of sequence code 334 and end of sequence code 354. In some embodiments, end of sequence code 354 is a static indication, and a first end of sequence code in the instruction stream after the start of sequence code ends the instruction sequence. In some embodiments, end of sequence code 354 is a dynamic indication, and a first end of sequence code executed after executing the start of sequence code ends the instruction sequence.

Figure 3C:
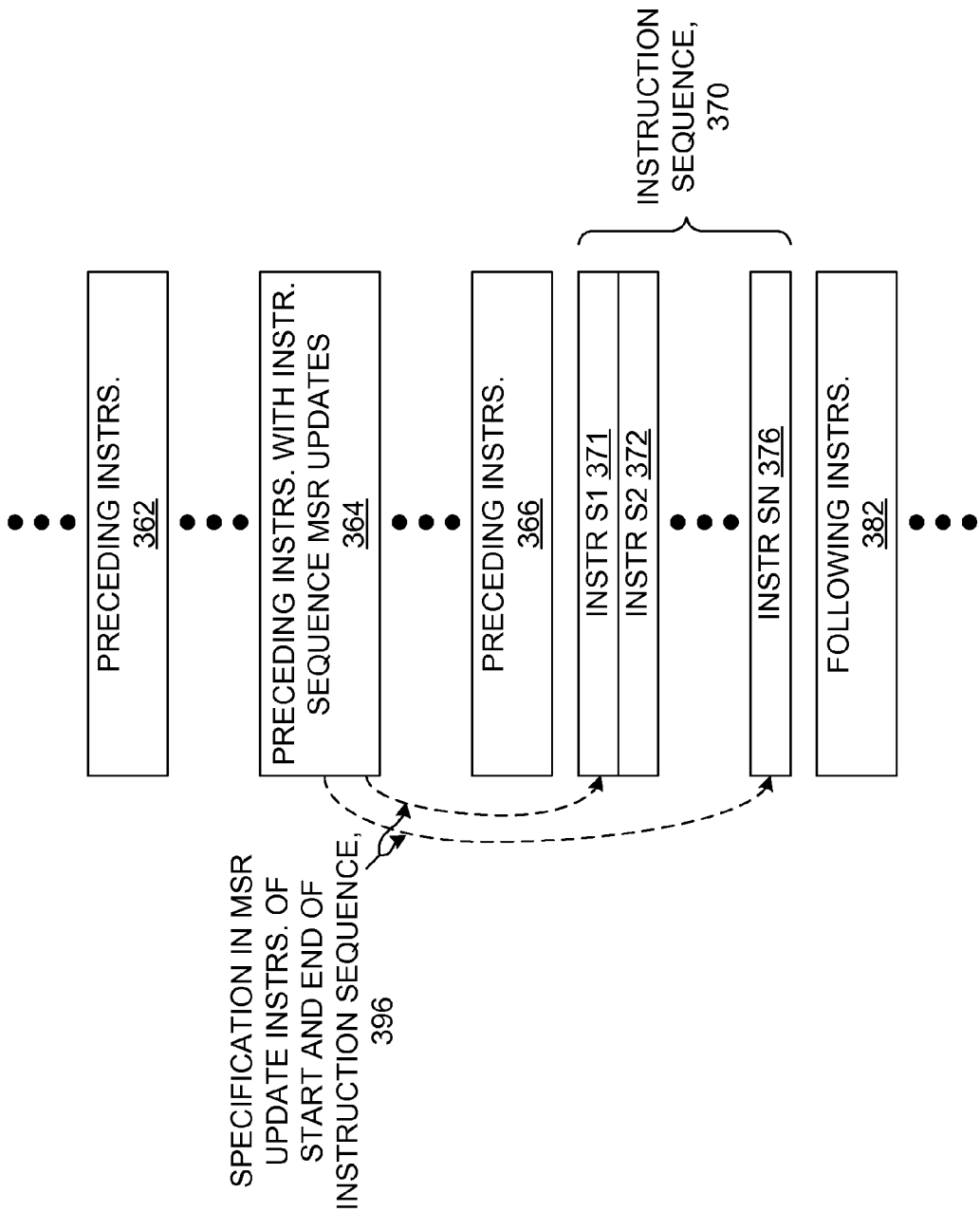
FIG. 3C illustrates selected details of an embodiment of a user-defined instruction sequence in an instruction stream, the instruction sequence indicated by one or more updates of machine-state registers.

FIG. 3C illustrates selected details of an embodiment of a user-defined instruction sequence in an instruction stream, the instruction sequence indicated by one or more updates of machine-state registers (such as via one or more writes to one or more elements of MSRs 119 and/or 129 of FIG. 1). Instruction sequence 370 is preceded by preceding instructions 362, 364, and 366. Instruction sequence 370 is followed by following instructions 382. Instruction sequence 370 starts with beginning instruction S1 371, and continues through ending instruction Sn 376. Preceding instructions 364 include MSR update instructions that modify machine-state registers and specify a location of beginning instruction 371 of the instruction sequence, a location of ending instruction 376 of the instruction sequence, and other properties associated with the instruction sequence, such as an execution mode. Conceptual pointers 396 indicate that the MSR updates specify a location of the start and a location of the end of the instruction sequence. In some embodiments, the location of the start of the instruction sequence is defined by a program counter value. According to various embodiments, the location of the end of the instruction sequence is defined by one or more of: a program counter value; a byte offset relative to the location of the start; an instruction count; and a trace count. In some embodiments, the location of the end of the instruction sequence does not refer directly to ending instruction Sn 376, but instead refers to a preceding or a following instruction.

Figure 3D:
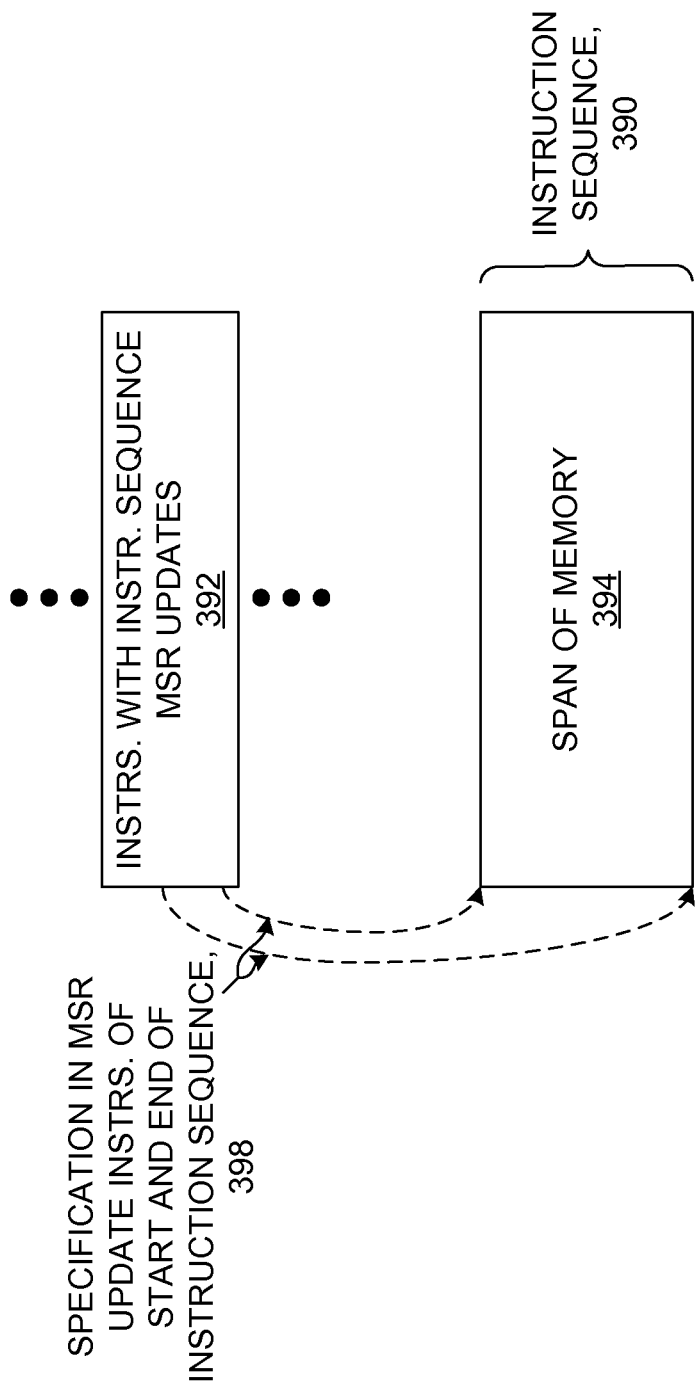
FIG. 3D illustrates selected details of an embodiment of a user-defined instruction sequence in an instruction image and/or an instruction stream, the instruction sequence indicated by one or more updates of machine-state registers.

FIG. 3D illustrates selected details of an embodiment of a user-defined instruction sequence in an instruction image and/or an instruction stream, the instruction sequence indicated by one or more updates of machine-state registers (such as via one or more writes to one or more elements of MSRs 119 and/or 129 of FIG. 1). Instructions 392 include MSR update instructions that modify machine-state registers and specify a beginning location of span of memory 394, and an ending location of span of memory 394. Conceptual pointers 398 indicate that the MSR updates specify the beginning location and the ending location of the span of memory. In some embodiments, the span of memory is an architecturally defined unit of memory, such as a page of memory. In various embodiments, the span of memory is defined by machine-state registers and/or other state within or accessed by the processor. For example, in some embodiments, the span of memory is defined, at least in part, by one or more of a segment descriptor, a page table entry, and a page descriptor entry. According to various embodiments, the span of memory is present in the instruction image and/or the instruction stream either prior to or subsequent to instructions 392.

Instruction sequence 390 is defined as all instructions in and/or wholly contained within span of memory 394. In various embodiments, the machine-state registers further specify properties associated with the instruction sequence, such as an execution mode. According to various embodiments, one or more of: the beginning location is optionally an instruction boundary; the ending location is optionally an instruction boundary; at least some of the contents of the span of memory are not instructions; the span of memory includes both data and instructions; and the span of memory includes one or more sequences of instructions, such as one or more subroutines and/or functions.

In some embodiments, some of a plurality of MSR updates are used to enable others of the MSR updates to have no effect on processing until all of the MSR updates have been completed. For example, such as with instructions with instruction sequence MSR updates illustrated in either FIG. 3C or FIG. 3D, an initial MSR update operates as an "instruction sequence disable" to disable instruction sequence processing, and a final MSR update, subsequent to other MSR updates, operates as an "instruction sequence enable" to re-enable instruction sequence processing. The other MSR updates between the initial and final MSR updates are not enabled to take effect until after the final MSR update has re-enabled instruction sequence processing, and hence intermediate MSR states, when less than all of the MSR updates have completed, have no effect on processing.

Figure 4:
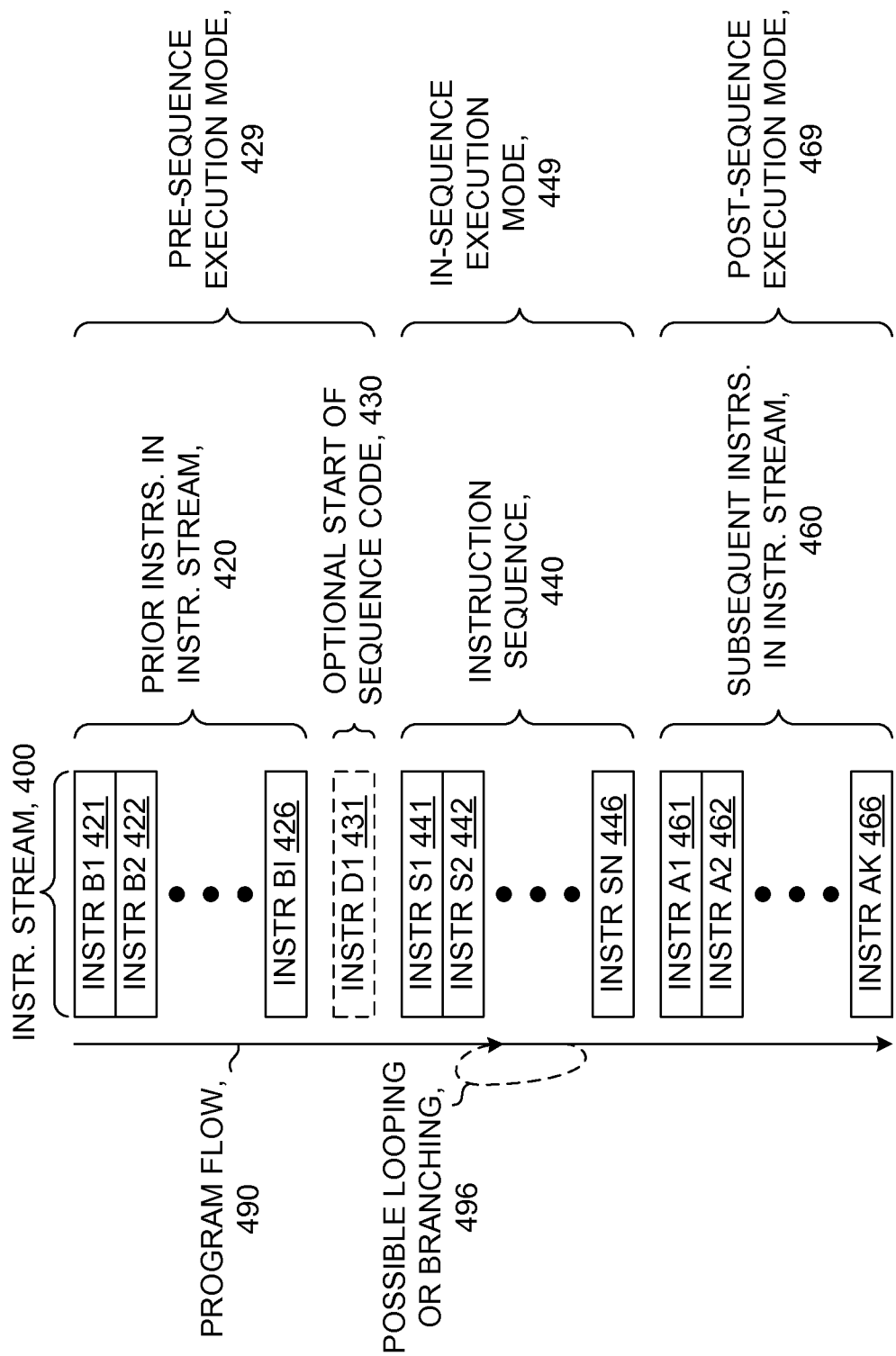
FIG. 4 illustrates an example program flow as executed by a processor incorporating execution modes for user-defined instruction sequences, and illustrating some of the execution modes.

FIG. 4 illustrates an example program flow as executed by a processor incorporating execution modes for user-defined instruction sequences, and illustrating some of the execution modes. Instruction stream 400 includes prior instructions 420, instruction sequence 440, and subsequent instructions 460. Program flow 490, along with possible looping or branching 496, illustrates a conceptual dynamic flow of execution through the instruction stream. While possible looping or branching 496 is illustrated at one point in program flow 490, this is for clarity of illustration, and program flow 490 optionally has multiple loops and/or branches at various points, with any of the branches being forward or backward in the instruction stream. Optional start of sequence code 430 is also illustrated as part of instruction stream 400. Start of sequence code 430 represents one of several ways instruction sequence 440 is definable, such as any of the ways illustrated in FIGS. 3A-3C.

FIG. 4 illustrates how a current execution mode of a processor changes in response to execution of instruction sequence 440. When executing prior instructions 420, the processor is in pre-sequence execution mode 429. In some embodiments and/or usage scenarios, the prior instructions define the instruction sequence. When beginning instruction 441 of the instruction sequence is executed, the processor is in in-sequence execution mode 449. Subsequent to the execution of ending instruction 446 of the instruction sequence, and by the time first subsequent instruction 461 is executed, the processor is in post-sequence execution mode 469. In various embodiments and/or usage scenarios, pre-sequence execution mode 429 and post-sequence execution mode 469 are different, unique, identical, similar, or substantially similar. In some embodiments, optional start of sequence code 430 is executed in pre-sequence execution mode 429. In other embodiments, optional start of sequence code 430 is executed in in-sequence execution mode 449.

In some embodiments, FIG. 4 illustrates how a current execution mode of a processor changes in response to fetching and/or decoding and/or translating of instruction sequence 440. As instructions of instruction stream 400 are fetched and/or decoded and/or translated, the presence of instruction sequence 440 affects the execution mode. In some embodiments, possible looping or branching 496 in instruction sequence 440 affects the fetching and/or the decoding and/or the translating via branch prediction, which determines a predicted sequence of the instructions of instruction stream 400. When fetching and/or decoding and/or translating prior instructions 420, the processor is in pre-sequence execution mode 429. When beginning instruction 441 of the instruction sequence is fetched and/or decoded and/or translated, the processor is in in-sequence execution mode 449. Subsequent to the fetching, the decoding, and/or the translating of ending instruction 446 of the instruction sequence, and by the time first subsequent instruction 461 is fetched, decoded, and/or translated, the processor is in post-sequence execution mode 469.

Figure 5:
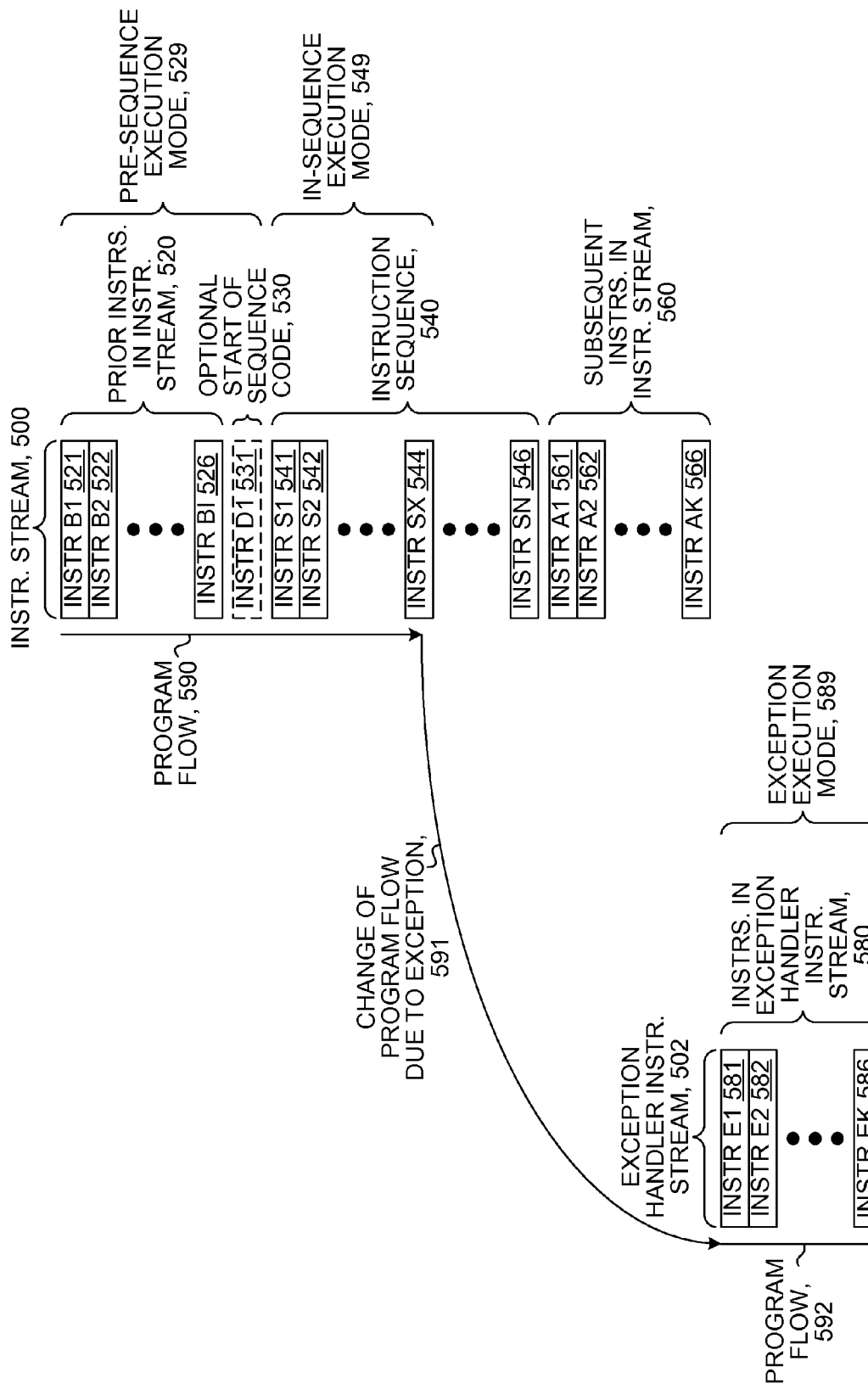
FIG. 5 illustrates an example program flow as executed by a processor incorporating execution modes for user-defined instruction sequences up to a point where an exception is taken.

FIG. 5 illustrates an example program flow as executed by a processor incorporating execution modes for user-defined instruction sequences up to a point where an exception is taken. Instruction stream 500 includes prior instructions 520, instruction sequence 540, and subsequent instructions 560. Program flow 590 illustrates a conceptual dynamic flow of execution through a portion of the instruction stream. Not illustrated for reasons of clarity is any possible looping or branching in the program flow, such as possible looping or branching similar to 496 in FIG. 4. Program flow 590 optionally has multiple loops and/or branches at various points, with any of the branches being forward or backward in the instruction stream. Optional start of sequence code 530 is also illustrated as part of instruction stream 500. Start of sequence code 530 represents one of several ways that instruction sequence 540 is definable, such as any of the ways illustrated in FIGS. 3A-3C.

FIG. 5 illustrates how a current execution mode of a processor changes in response to execution of instruction sequence 540 and an exception, such as an interrupt or an error condition, taken during the execution. When executing prior instructions 520, the processor is in pre-sequence execution mode 529. In some embodiments and/or usage scenarios, the prior instructions define the instruction sequence. When beginning instruction 541 of the instruction sequence is executed, the processor is in in-sequence execution mode 549. Associated with instruction 544, an exception is recognized, so that program flow 590 does not reach, or at least does not directly reach, ending instruction 546 of the instruction sequence. Instead, the program flow is vectored to an exception handler, as illustrated by change of program flow 591, leading to instructions 580 in the exception handler, starting with a first exception handler instruction 581. Program flow continues through the exception handler as program flow 592. In some usage scenarios, the exception handler is treated as an independent instruction stream 502. In some embodiments, instruction stream 500 is part of an application program, and instruction stream 502 is part of an operating system. In other embodiments, both of instruction streams 500 and 502 are part of an operating system or an embedded application. In some embodiments, the exception handler optionally and/or selectively returns to the instruction sequence. In some embodiments, the exception handler optionally and/or selectively terminates the execution of instruction stream 500.

In some embodiments, when the processor recognizes an exception, the execution mode is changed to exception execution mode 589. According to various embodiments, the exception execution mode does one or more of: disabling interrupts; enabling supervisor privileges; and changing page tables or otherwise enabling access to supervisor data structures.

In various embodiments, the exception handler optionally and/or selectively returns to the instruction sequence, such as by returning to instruction 544 (via a program flow path not illustrated, for reasons of clarity, in FIG. 5). In some embodiments, returning from an exception to instruction sequence 540 restores the execution mode to in-sequence execution mode 549. In some embodiments, returning from an exception to instruction sequence 540 restores a global or default execution mode. In some embodiments, the exception handler defines the execution mode to be used after returning to the instruction sequence.

Figure 6:
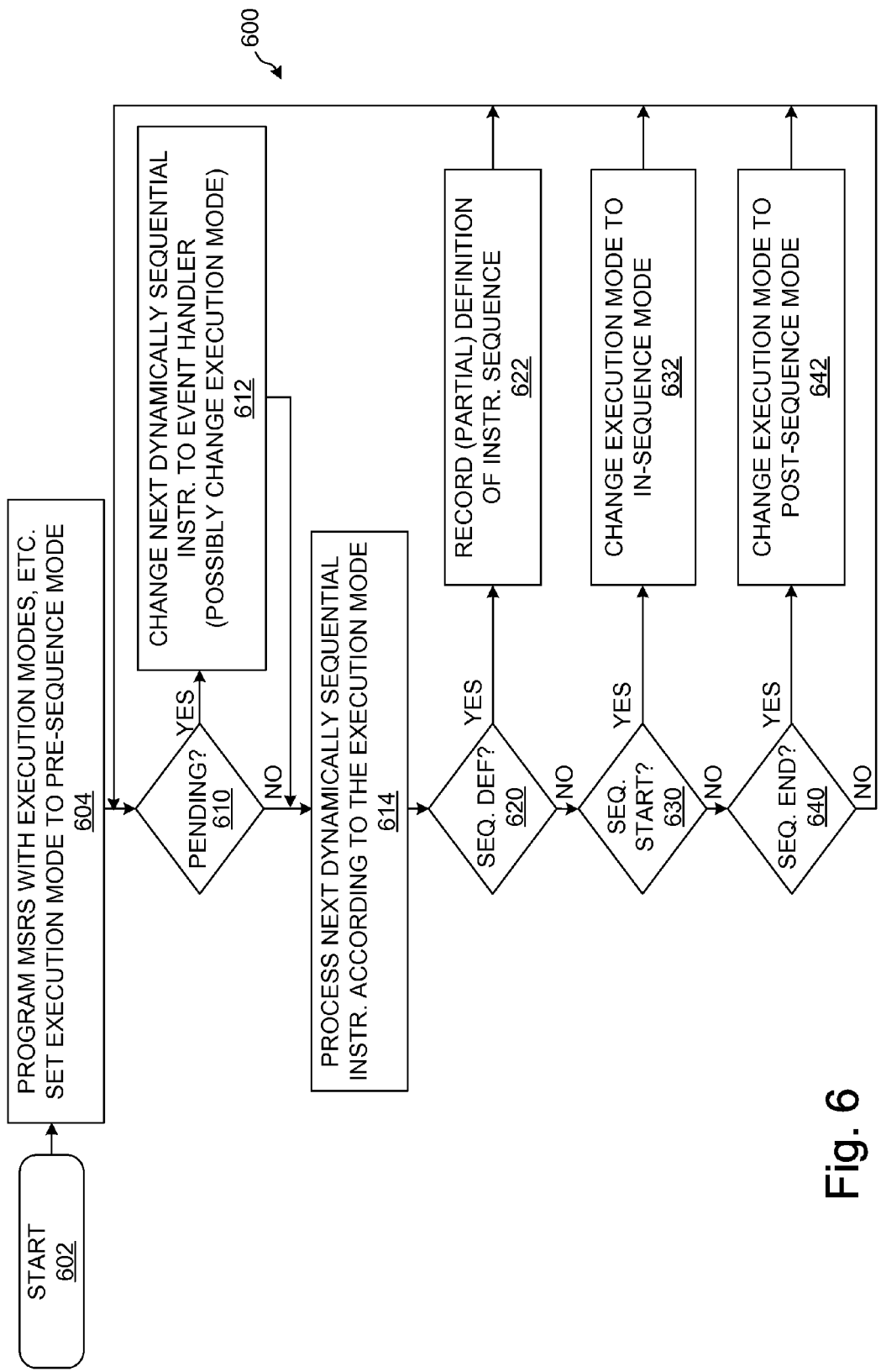
FIG. 6 illustrates selected details of a process for dynamically determining execution modes of instructions in an instruction stream containing user-defined instruction sequences.

FIG. 6 illustrates selected details of a process for dynamically determining execution modes of instructions in an instruction stream containing user-defined instruction sequences. According to various embodiments, selected elements of process 600 are performed by one or more of: an instruction supply unit; a fetch unit; a decode unit; a trace unit; an execution unit; other units of a processor; and control circuitry of any of the foregoing. In the description of the figure, phases such as "block 604 initializes" are shorthand for "processing associated with block 604 initializes", and so forth.

Process 600 begins in block 602 and continues to block 604. Block 604 represents system-level initialization prior to beginning processing (such as fetching, decoding, translating, or executing) of an instruction stream. In some embodiments, block 604 initializes various machine-state registers, including placing the processor in a pre-sequence execution mode. In some embodiments, block 604 represents an operating system configuring a processor for running of an application. In various embodiments block 604 represents an exception handler re-initializing machine-state registers prior to returning control to an application. The process continues with block 610.

In some embodiments, such as where process 600 is performed during execution of instructions, block 610 checks for any pending enabled events, such as a pending enabled interrupt. If no pending enabled events are detected, then the process continues to block 614. If there are any pending enabled events detected, then the process continues with block 612, where program flow is changed due to the pending enabled event(s). In some embodiments, the pending enabled event is an enabled interrupt, and the program flow is changed to an exception (or interrupt) handler. In some embodiments, the pending enabled event is a debug event, and the program flow is changed to a debug or trace handler. In some embodiments, an execution mode is optionally changed due to the pending enabled event. In various embodiments, the pending enabled event is processed in hardware, and does not change the program flow. For example, in some usage scenarios, the pending enabled event is a power-management event that changes a clock rate, but that otherwise has no effect on execution. The process proceeds from block 612 to block 614.

Block 614 represents processing (such as fetching, decoding, translating, or executing) of a next instruction in program flow order, where the program flow order is selectively modified due to any of branch prediction, branching, looping, or pending enabled events as detected in block 610 (and causing a change in the program flow order in block 612). The instruction processed in block 614 is optionally any type of instruction, and process 600 illustrates selected details of instruction processing (such as by execution) related to the processing of instruction sequences according to various execution modes. Accordingly, block 620 checks whether the instruction is part of an instruction sequence definition, block 630 checks whether the instruction is immediately prior to a start of an instruction sequence (e.g., a next dynamically sequential instruction starts the instruction sequence), and block 640 checks whether the instruction is an ending instruction in an instruction sequence.

If block 620 determines the instruction is part of an instruction sequence definition, then the process continues to block 622. In block 622, an instruction sequence definition is processed. In various embodiments, the instruction sequence definition takes various forms, such as any of the embodiments illustrated in FIGS. 3A-3C. For example, the embodiment illustrated in FIG. 3C includes one or more machine-state register updates, and accordingly, in some embodiments, block 622 is traversed several times, once for each machine-state register updating instruction that is part of the instruction sequence definition. In some embodiments, such as those illustrated in FIGS. 3A-3B, where the instruction sequence definition immediately precedes the instruction sequence, the process optionally goes from block 622 to block 632 (a path not illustrated for reasons of clarity) to change the execution mode to an in-sequence execution mode as defined by the instruction sequence definition.

If block 630 determines the instruction is immediately prior to a start of an instruction sequence (a next dynamically sequential instruction starts the instruction sequence), then the process continues to block 632. In block 632, the execution mode is changed to an in-sequence execution mode, such as in-sequence execution mode 449 in FIG. 4, thus enabling a next instruction to be a beginning instruction in the instruction sequence.

If block 640 determines the instruction is an ending instruction in an instruction sequence, then the process continues to block 642. In block 642, the execution mode is changed to a post-sequence execution mode, such as post-sequence execution mode 469 in FIG. 4, thus enabling a next instruction to be a first instruction subsequent to the instruction sequence.

After detecting any of the conditions checked for in blocks 620, 630, and 640 and optionally performing the corresponding block for that condition (blocks 622, 632, and 642 respectively), or after detecting the lack of any of the conditions, the process returns to block 610 to check for any pending enabled events. Pending enabled events are optionally present due either to arrival of new events, or due to changes in execution mode in blocks 632 and 642.

Figure 7:
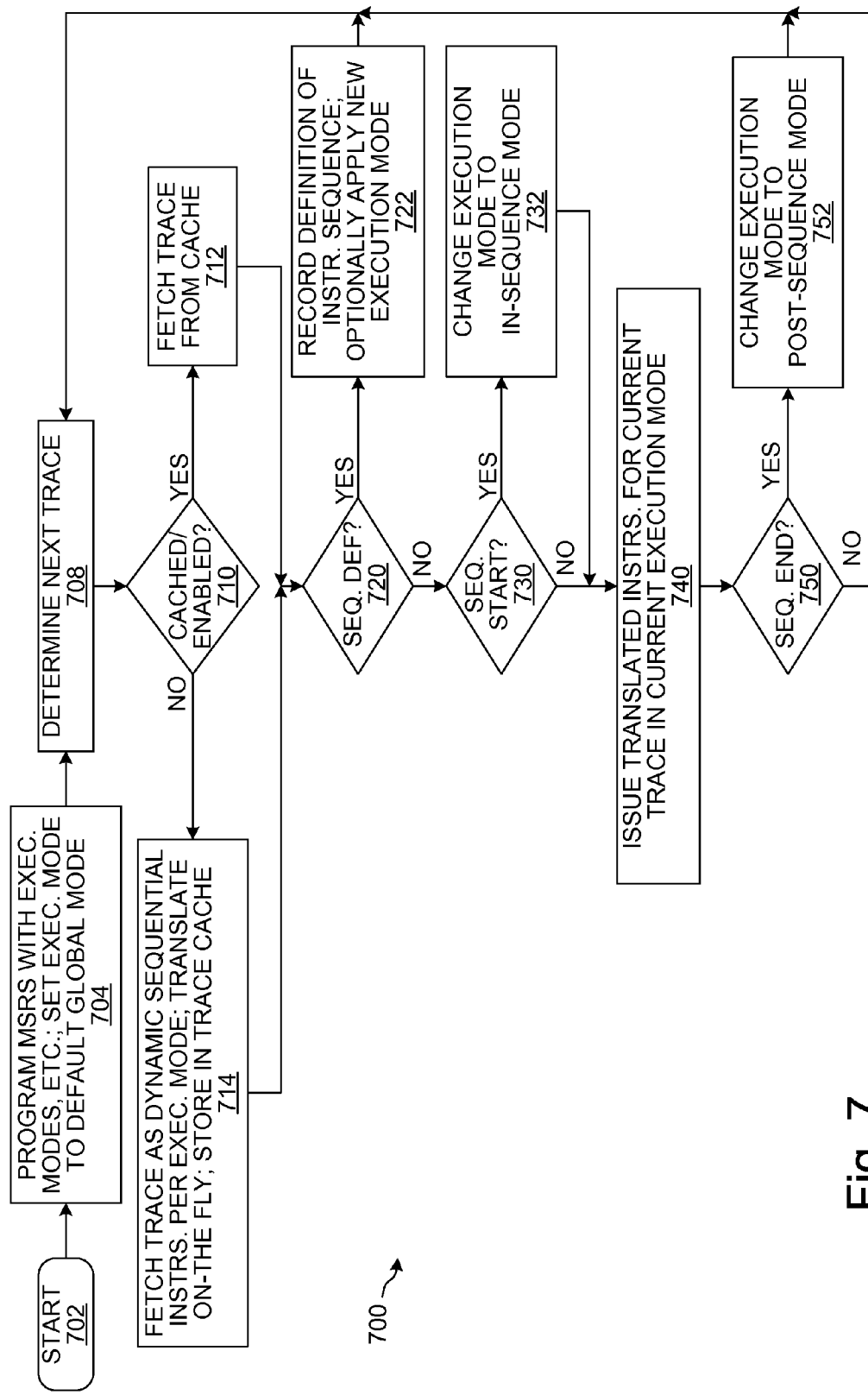
FIG. 7 illustrates selected details of a process for a trace unit to fetch, to translate, and to issue instructions in an instruction stream containing user-defined instruction sequences with differing execution modes.

FIG. 7 illustrates selected details of a process for a trace unit of a processor to fetch, to translate, and to issue instructions in an instruction stream containing user-defined instruction sequences with differing execution modes. In the description of the figure, phases such as "block 704 initializes" are shorthand for "processing associated with block 704 initializes", and so forth. Process 700 begins in block 702 and continues to block 704. Block 704 represents system-level initialization prior to beginning execution of an instruction stream. In some embodiments, block 704 initializes various machine-state registers, including placing the processor in a pre-sequence execution mode. In some embodiments, block 704 represents an operating system configuring the processor for running of an application. In various embodiments block 704 represents an exception handler re-initializing machine-state registers prior to returning control to an application. In some embodiments, block 704 represents a power-on or post-reset initialization of processor state, and is performed by a control processor different from the processor executing the instruction stream. In various embodiments, block 704 defines an initial trace where execution starts. The process continues with block 708.

Block 708 represents determining of a next trace to be processed and issued into a pipeline of the processor. According to various embodiments, the determining of the next trace is performed by one or more of: a program counter mechanism; branch prediction logic; and "next trace" history, based on one or more preceding traces. In various embodiments, one or more traces are speculatively determined and issued. In some embodiments, the determining of the next trace is affected by execution of instructions. For example, a branch instruction selects a path not speculatively issued by the trace unit, causing the trace unit to fetch a trace at a destination of the branch instruction. Block 708 defines a current trace as the determined next trace, and the process continues in block 710.

Block 710 checks whether the current trace is to be obtained from a trace cache, or in some other fashion. A trace cache is used to provide a previously translated version of a trace if the trace is found in a particular trace cache, and if a current execution mode enables access to the particular trace cache. If the trace is not found in a trace cache, or if the current execution mode prevents retrieval of the trace from a trace cache, then instructions in the trace are fetched in a conventional manner, and are translated on-the-fly. In some embodiments, a type or manner of on-the-fly translation, including determining trace boundaries, is controlled by the current execution mode. In some embodiments, if enabled by the current execution mode, results of the on-the-fly translation are put into a trace cache. In various embodiments, there are one or more trace caches holding previously translated versions of traces. For example, a warm trace cache (such as a basic block cache) holds traces that have been recently translated on-the-fly by hardware, and a hot trace cache (such as a multi-block cache) holds more highly optimized versions of translated traces. In some embodiments, the optimizations performed on a trace are a function of previous executions of the trace. In some embodiments and/or usage scenarios, the hot trace cache is populated via promotion, and the promotion is by software, hardware, or a combination of both. In various embodiments, software optionally reads the warm trace cache and populates the hot trace cache with more highly-optimized versions of some or all of the same traces. With the current trace fetched by one of the foregoing mechanisms, the process continues with block 720.

If block 720 determines that the current trace is not (or does not contain) an instruction sequence definition, then the process proceeds to block 730. If block 720 determines that the current trace is (or contains) an instruction sequence definition, then the process continues to block 722. In block 722, the instruction sequence definition is processed. In various embodiments, the instruction sequence definition takes various forms, such as any of the embodiments illustrated in FIGS. 3A-3C. For example, the embodiment illustrated in FIG. 3A includes a start of sequence code 304 that defines an extent of the instruction sequence and its execution mode. In some embodiments, the trace unit fully processes the instruction sequence definition, and block 722 then returns to block 708 to determine a next trace. In other embodiments, some or all of the instruction sequence definition is issued into the processor pipeline, and block 722 continues to block 730 (this path is not illustrated for reasons of clarity). In some embodiments, some or all of a change of execution mode illustrated in block 732 occurs as a function of processing of the instruction sequence definition in block 722. In some embodiments where the execution mode affects properties of an instruction sequence including properties relating to fetching, translation, or trace caching of the instruction sequence, block 722 performs setting of the execution modes related to those properties. The process continues with block 730.

If block 730 determines that the current trace is not a start of a new instruction sequence, then the process continues to block 740. If block 730 determines that the current trace is, or is the start of, a new instruction sequence, then the process continues to block 732. In block 732, the execution mode is changed to an in-sequence execution mode for the current trace, such as in-sequence execution mode 449 in FIG. 4, thus enabling the current trace to operate in a distinct execution mode. In some embodiments, some or all of the change of the execution mode has been accomplished in block 722 when the instruction sequence definition was processed. The process continues with block 740.

Block 740 represents an issuing into the processor pipeline of translated instructions in the current trace. In various embodiments, the instructions issued in block 740 are optionally any types of instructions. In some embodiments, the trace unit processes some of the instructions, such as some or all of an instruction sequence definition, and does not issue those instructions into the processor pipeline. In some embodiments, the trace unit issues each instruction along with a corresponding trace ID. In some embodiments, some or all of the execution mode is passed into the processor pipeline with each issued instruction, thus enabling each instruction to be pipelined along with a corresponding execution mode. In various embodiments, the trace unit is enabled to issue multiple instructions at a time. In some embodiments, the trace unit provides auxiliary information about the current trace, such as a number of load and/or store instructions in the trace, as the trace is issued into the processor pipeline. The process continues with block 750.

If block 750 determines that this is not an end of an instruction sequence, then the process returns to block 708 to determine a next trace to be fetched and issued. If block 750 determines that this is an end of an instruction sequence, then the process continues to block 752. Block 752 changes the execution mode to an appropriate post-sequence execution mode, such as post-sequence execution mode 469 in FIG. 4. According to various embodiments, the post-sequence execution mode is one or more of: a default global mode; a last mode that was in effect prior to issuing of the instruction sequence, such as pre-sequence execution mode 429 in FIG. 4; a mode of an outer, enclosing instruction sequence; a mode from a lower-priority one of a plurality of sets of machine-state registers, where the in-sequence execution mode is a mode from a higher-priority one of the sets; and a mode defined in machine-state registers. The process then returns to block 708 to determine a next trace to be fetched and issued.

The forgoing description of a process for fetching, decoding, translating, and/or executing instructions in an instruction stream containing instruction sequences with differing execution modes is conceptual in that the nature of the process varies, according to various embodiments, depending on the nature of the elements performing the process. For example, the forgoing description assumes one instruction at a time execution in a processor, whereas a super-scalar processor fetches and executes multiple instructions each clock cycle. For another example, an out-of-order processor executes instructions out-of-order while providing an appearance of in-order execution. The instruction issue and execution capabilities of the processor, as well as many other features of the processor design, vary without restriction according to various embodiments.

SELECTED HARDWARE TECHNIQUES

In some embodiments, various combinations of all or portions of functions performed by an instruction supply unit (such as ISU 102 of FIG. 1), machine-state registers (such as MSRs 119 or MSRs 129 of FIG. 1), a processor core (such as core 103.1 of FIG. 1), and portions of a processor or a microprocessor providing all or portions of the aforementioned functions, are specified by descriptions compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

EXAMPLE EMBODIMENTS

In some embodiments, such as a first example embodiment, a method for executing instruction sequences in a processor includes: executing instructions of an instruction stream according to a first execution mode; recognizing in the instruction stream a start of sequence code, the start of sequence code associated with an instruction sequence definition specifying an instruction sequence in the instruction stream, the instruction sequence including one or more instructions; subsequent to the recognizing, executing the instruction sequence according to a second execution mode; and subsequent to the instruction sequence execution, continuing execution of the instruction stream according to a third execution mode.

In some embodiments, such as a second example embodiment, a method for executing instruction sequences in a processor includes: executing instructions of an instruction stream according to a first execution mode; providing an instruction sequence definition specifying an instruction sequence in the instruction stream, the instruction sequence including one or more instructions; subsequent to the providing, executing the instruction sequence according to a second execution mode; and subsequent to the instruction sequence execution, continuing execution of the instruction stream according to a third execution mode.

In some embodiments, such as a third example embodiment, a method for processing (such as by fetching, decoding, and/or translating) instruction sequences in a processor includes: processing instructions of an instruction stream according to a first execution mode; recognizing in the instruction stream a start of sequence code, the start of sequence code associated with an instruction sequence definition specifying an instruction sequence in the instruction stream, the instruction sequence including one or more instructions; subsequent to the recognizing, processing the instruction sequence according to a second execution mode; and subsequent to the instruction sequence processing, continuing processing of the instruction stream according to a third execution mode.

In some embodiments, such as a fourth example embodiment, a method for processing (such as by fetching, decoding, and/or translating) instruction sequences in a processor includes: processing instructions of an instruction stream according to a first execution mode; providing an instruction sequence definition specifying an instruction sequence in the instruction stream, the instruction sequence including one or more instructions; subsequent to the providing, processing the instruction sequence according to a second execution mode; and subsequent to the instruction sequence processing, continuing processing of the instruction stream according to a third execution mode.

In some embodiments that are methods according to any of the third or fourth example embodiments, the processing is performed by an instruction supply unit of the processor. In various embodiments, the instruction supply unit is coupled to an execution pipeline of the processor. In further embodiments, the instruction supply unit includes a trace unit, and the trace unit providing traces of processed instructions for execution to the execution pipeline.

In some embodiments, such as a fifth example embodiment that is a method according to any of the third or fourth example embodiments, the method further includes: subsequent to the processing, issuing at least a portion of the processed instructions into an execution pipeline of the processor, the processed instructions including information indicative of the respective first, second, or third execution mode with which the instructions were processed; subsequent to the issuing, executing at least a portion of the processed instructions, the executing being according to the respective first, second, or third execution mode; and the instruction sequence is executed according to the second execution mode. Further, in some embodiments, the processing is performed by a trace unit of the processor, and processed instructions are issued to the execution pipeline along with a corresponding trace ID.

According to various embodiments that are methods according to any of the second or fourth example embodiments, the instruction sequence definition includes one or more of: a sequence definition code in the instruction stream; and a start of sequence code prior to the instruction sequence, along with an end of sequence code subsequent to the instruction sequence. Further, in some embodiments, the sequence definition code is a start of sequence code. Further, in various embodiments, the start of sequence code includes an execution mode for the instruction sequence.

According to various embodiments that are methods according to any of the second or fourth example embodiments, the instruction sequence definition is provided, at least in part, by one or more of: executing instructions that modify one or more machine-state registers; a translation look-aside buffer entry used to access the instruction sequence; and a code segment descriptor, a page table entry, or a page descriptor entry used to fetch the instruction sequence.

In some embodiments that are methods according to any of the first, second or fifth example embodiments, a branch instruction from outside the instruction sequence into the instruction sequence enables execution in the second execution mode.

In some embodiments that are methods according to any of the first, second or fifth example embodiments, a branch instruction from outside the instruction sequence into the instruction sequence skipping the instruction sequence definition and/or a beginning instruction of the instruction sequence does not enable execution in the second execution mode.

In some embodiments that are methods according to any of the first, second or fifth example embodiments, an exception during execution of the instruction sequence enables execution in the third execution mode.

In some embodiments, such as a sixth example embodiment that is a method according to any of the first, second or fifth example embodiments, the second execution mode determines at least in part the instruction types that are enabled during the execution of the instruction sequence.

In some embodiments that are methods according to the sixth example embodiment, the second execution mode optionally and/or selectively enables use of one or more microcode patches.

In some embodiments, such as a seventh example embodiment that is a method according to any of the third or fourth example embodiments, the second execution mode determines at least in part the instruction types that are enabled during the processing of the instruction sequence.

According to various embodiments that are methods according to any of the sixth or seventh example embodiments, one or more of: supervisor-state instruction types are not enabled; I/O instruction types are not enabled; and one or more microcode patch instruction types are enabled. According to various embodiments, a microcode patch instruction type extends an instruction set with a new instruction type, and/or supplies a new definition for a microcoded instruction type, and/or overrides a hardwired instruction type with a microcoded definition.

In some embodiments that are methods according to the sixth example embodiment, attempting to execute a disabled instruction type causes an exception. Further, in some embodiments, the exception enables execution in the third execution mode.

In some embodiments that are methods according to any of the first, second or fifth example embodiments, if at least one type of interrupt-causing event occurs during the execution of the instruction sequence, then an interrupt due to the event is held pending until the completion of the execution of the instruction sequence. Further, according to various embodiments, the interrupt-causing event is one or more of a non-maskable interrupt,
a system-management interrupt,
a timer interrupt,
an I/O interrupt, and
a power-management interrupt.

In some embodiments that are methods according to any of the first, second or fifth example embodiments, if at least one type of hardware event occurs during the execution of the instruction sequence, then a hardware action due to the event is held pending until the completion of the execution of the instruction sequence. Further, according to various embodiments, the hardware event is one or more of a power-management event (e.g. a request to power-up or power-down a core or portion thereof), a thermal event (e.g. recognition that a core is operating at or above a threshold temperature), and a core migration event (e.g. a request to move processor state from one core to another).

According to various embodiments that are methods according to any of the first through fourth example embodiments, the instruction sequence definition includes one or more of: a count of the number of instructions in the instruction sequence; a final program counter value, the final program counter value indicating the end of the instruction sequence; and a specification of the second execution mode.

According to various embodiments that are methods according to any of the first through fourth example embodiments, the second execution mode is specified by one or more of: a machine-state register; and a combination of a machine-state register and a portion of the instruction sequence definition.

According to various embodiments that are methods according to any of the first through fourth example embodiments, one or more of: the first execution mode and the third execution mode are identical; and the first execution mode and the third execution mode are substantially the same execution mode.

According to various embodiments that are methods according to any of the first, second or fifth example embodiments, one or more of: the second execution mode is a non-interruptible mode; and the second execution mode includes an atomic mode. Further, in some embodiments, the atomic mode is interruptible by power-management events.

According to various embodiments that are methods according to any of the first, second or fifth example embodiments, at least one of the first and third execution modes enables one or more of: at least one type of interrupt to be taken that the second execution mode disables; and at least one type of hardware event to be processed that the second execution mode disables.

In some embodiments that are methods according to any of the first, second or fifth example embodiments, the occurrence of an interrupt not disabled in the second execution mode during the execution of the instruction sequence is recorded in a machine-state register.

According to various embodiments that are methods according to any of the first, second or fifth example embodiments, one or more of: an elapsed time spent executing in the second execution mode is recorded in a machine-state register; and an elapsed time spent executing the instruction sequence is recorded in a machine-state register. Further, in some embodiments, the elapsed time is measured in clock cycles.

In some embodiments that are methods according to any of the first, second or fifth example embodiments, an exception is taken when commencing execution of the instruction sequence if a permission to use instruction sequences is not enabled by a machine-state register. Further, in some embodiments, the machine-state register is solely writable in a privileged mode.

In some embodiments, such as an eighth example embodiment that is a method according to any of the first through fifth example embodiments, an exception is taken when commencing processing (such as execution) of the instruction sequence if a capability specified in the instruction sequence definition is not permitted by a machine-state register controlling or limiting the capability. Further, according to various embodiments, one or more of: the machine-state register is solely writable in a privileged mode; the capability is a maximum length of the instruction sequence; the capability is a maximum number of instructions in the instruction sequence; the capability is a maximum execution time for the instruction sequence; the capability is a maximum number of traces in the instruction sequence; the capability is a disabling of an interrupt or of a hardware event; and the capability is an ability to execute the instruction sequence as an atomic instruction sequence. In various embodiments, the maximum execution time is measured in clock cycles.

In some embodiments, such as a ninth example embodiment that is a method according to any of the first, second or fifth example embodiments, a machine-state register specifies a maximum number of instructions and/or cycles to be executed in the instruction sequence in the second execution mode.

According to various embodiments that are methods according to the ninth example embodiment, execution of the instruction sequence for longer than the maximum number of instructions and/or cycles causes and/or enables one or more of: an exception; and execution in the third execution mode. Further, in some embodiments, the exception enables execution in the third execution mode.

In some embodiments that are methods according to any of the first through fourth example embodiments, the instruction sequence contains one or more of branch, jump, call, return, and other transfer-of-control instructions. Further, in some embodiments, at least some of the branch, jump, call, return, and/or other transfer-of-control instructions transfer control within the instruction sequence.

In some embodiments that are methods according to any of the first through fifth example embodiments, one or more machine-state registers record statistics from execution of the instruction sequence. According to various embodiments, the statistics include one or more of: a number of cycles; a number of instructions; a number of micro-operations; a number of traces; a number of branches; a number of jumps; a number of calls; a number of any specific type of instruction; a starting instruction location of the instruction sequence; a terminating instruction location of the instruction sequence; and any other statistic from the execution.

In some embodiments that are methods according to any of the first, second or fifth example embodiments, the method further includes: prior to the executing, scheduling the instructions for execution in a preferred order; and the second execution mode is used, at least in part, to determine the preferred order for the instructions in the instruction sequence.

In some embodiments that are methods according to any of the first, second or fifth example embodiments, the method further includes: prior to the executing, scheduling the instructions for execution in a preferred order; issuing the scheduled instructions for execution; and the second execution mode is used, at least in part, to control the frequency and manner of issuing instructions in the instruction sequence for execution.

In some embodiments, such as a tenth example embodiment that is a method according to the fifth example embodiment, processing instructions includes fetching instructions, and translating instructions into an internal format.

According to various embodiments that are methods according to the tenth example embodiment, the second execution mode controls, at least in part, one or more of: a type or amount of optimization applied when translating instructions of the instruction sequence; and a manner of translating instructions of the instruction sequence. Further, in some embodiments, the second execution mode controls, at least in part, an assumption during translation as to whether memory references in the instruction sequence address I/O space.

In some embodiments, such as an eleventh example embodiment that is a method according to the tenth example embodiment, the translated instructions of the instruction sequence in the internal format are stored in one or more trace caches.

According to various embodiments that are methods according to the eleventh example embodiment, the second execution mode controls, at least in part, one or more of: the selection of a trace cache for storing one or more translated instructions of the instruction sequence; and the stickiness of the translated instructions of the instruction sequence in the one or more trace caches.

In some embodiments that are methods according to the eleventh example embodiment, the issuing of instructions includes reading translated instructions from the one or more trace caches, and the second execution mode controls, at least in part, the selection of the trace cache accessed to issue the translated instructions of the instruction sequence.

In some embodiments, such as a twelfth example embodiment, a processor includes: a fetch unit fetching instructions in an instruction stream; an execution unit executing the instructions according to an execution mode; and an instruction sequence definition specifies at least in part the execution mode within an associated instruction sequence of the instruction stream, the instruction sequence including one or more instructions.

In some embodiments, such as a thirteenth example embodiment, a processor includes: a trace unit operating according to an execution mode, the trace unit supplying one or more traces of translated instructions from an instruction stream to an execution unit, each trace associated with a respective execution mode; the execution unit executing at least a portion of the one or more traces; and an instruction sequence definition specifies at least in part the execution mode within an associated instruction sequence of the instruction stream, the instruction sequence including one or more instructions. Further, in some embodiments, the trace unit translates the instruction sequence into one or more traces of translated instructions.

In some embodiments that are processors according to the thirteenth example embodiment, the trace unit recognizes and interprets at least a portion of the instruction sequence definition, and the trace unit operates according to a particular execution mode specified in the instruction sequence definition when operating upon instructions in the instruction sequence. Further, in some embodiments, a translation by the trace unit of the instruction sequence into one or more traces of translated instructions is controlled at least in part by the particular execution mode.

In some embodiments, such as a fourteenth example embodiment that is a processor according to the thirteenth example embodiment, the trace unit includes an instruction fetching sub-unit, an instruction translation sub-unit, and one or more trace caches.

In some embodiments that are processors according to the fourteenth example embodiment, at least one trace supplied to the execution unit is provided by a particular trace cache. Further, in some embodiments, the particular trace cache is selected from among the one or more trace caches at least in part by a respective execution mode of the at least one trace.

In some embodiments that are processors according to the fourteenth example embodiment, the instruction translation sub-unit is responsive to a respective execution mode of a particular trace being translated. Further, in some embodiments, a selection of a particular trace cache of the one or more trace caches to store the translated version of the particular trace is based, at least in part, on a respective execution mode of the particular trace.

In some embodiments that are processors according to the fourteenth example embodiment, assumptions made by the instruction translation sub-unit regarding a nature of instructions in a particular trace being translated are controlled at least in part by a respective execution mode of the particular trace. Further, in some embodiments, the assumption as to whether memory-referencing instructions in the particular trace refer to I/O space or not is controlled at least in part by the respective execution mode.

In some embodiments, such as a fifteenth example embodiment that is a processor according to the thirteenth example embodiment, the trace unit further supplies to the execution unit an indication of the respective execution mode of each trace, and the execution unit executes at least a portion of the one or more traces according to the respective execution mode of each trace.

In some embodiments, such as a sixteenth example embodiment that is a processor according to any of the twelfth or fifteenth example embodiments, the instruction sequence definition specified execution mode is an in-sequence execution mode, and the execution unit executes the instruction sequence according to the in-sequence execution mode.

In some embodiments, such as a seventeenth example embodiment that is a processor according to the sixteenth example embodiment, prior to executing the instruction sequence, the execution unit executes instructions according to a pre-sequence execution mode.

In some embodiments, such as an eighteenth example embodiment that is a processor according to the seventeenth example embodiment, subsequent to executing the instruction sequence, the execution unit executes instructions according to a post-sequence execution mode.

According to various embodiments that are processors according to the eighteenth example embodiment, the pre-sequence execution mode and the post-sequence execution mode are one or more of: identical; and substantially the same.

In some embodiments that are processors according to any of the twelfth or thirteenth example embodiments, the execution mode within the instruction sequence is specified at least in part by one or more machine-state registers.

In some embodiments that are processors according to any of the twelfth or thirteenth example embodiments, the instruction sequence definition specifies a span of memory, and the instruction sequence includes all instructions in and/or contained wholly within the span of memory.

According to various embodiments that are processors according to any of the twelfth or thirteenth example embodiments, the instruction sequence definition includes one or more of: a start-instruction-sequence code in the instruction stream; and a start-instruction-sequence code prior to the instruction sequence, and an end-instruction-sequence code subsequent to the instruction sequence.

In some embodiments, such as a nineteenth example embodiment that is a processor according to any of the twelfth or thirteenth example embodiments, the instruction sequence definition is provided at least in part by one or more machine-state register updating instructions in the instruction stream that modify machine-state registers, the one or more machine-state register updating instructions executing prior to the instruction sequence.

In some embodiments, such as a twentieth example embodiment that is a processor according to the nineteenth example embodiment, the instruction sequence is a first instruction sequence; the instruction sequence definition is a first instruction sequence definition; the execution mode within the instruction sequence is a first execution mode; a first set of machine-state registers provides at least in part the first instruction sequence definition; and a second instruction sequence definition defines a second instruction sequence, the second instruction sequence definition including a second execution mode for the second instruction sequence.

According to various embodiments that are processors according to the twentieth example embodiment, one or more of: a second set of machine-state registers provides at least in part the second instruction sequence definition; and the second instruction sequence definition is provided at least in part in-line in the instruction stream.

In some embodiments, such as a twenty-first example embodiment that is a processor according to the twentieth example embodiment, the location of the first instruction sequence overlaps at least in part with the location of the second instruction sequence, and at least one overlapped instruction is located in both the first instruction sequence and the second instruction sequence.

According to various embodiments that are processors according to the twenty-first example embodiment, one or more of: executing the at least one overlapped instruction causes an exception; and the at least one overlapped instruction is executed using an execution mode that is a function of at least the first execution mode and the second execution mode. Further, in some embodiments, the function accounts for a respective privilege level associated with each of the first instruction sequence and the second instruction sequence.

According to various embodiments that are processors according to any of the twelfth or thirteenth example embodiments, the instruction sequence definition specifies, at least in part, one or more of: a start of the instruction sequence; and an end of the instruction sequence. Further, according to various embodiments, the start of the instruction sequence is specified as one or more of: a program counter value; and an implicit offset from a start-instruction-sequence code in the instruction stream. Further, according to various embodiments, the end of the instruction sequence is specified by one or more of: a program counter value; an offset relative to a program counter value of a start of the instruction sequence; and an instruction count.

In some embodiments that are processors according to any of the twelfth or thirteenth example embodiments, the instruction sequence definition includes an execution mode for the instruction sequence.

In some embodiments that are processors according to any of the twelfth or fifteenth example embodiments, a branch instruction from outside the instruction sequence into the instruction sequence enables execution in the instruction sequence definition specified execution mode.

In some embodiments that are processors according to any of the twelfth or fifteenth example embodiments, a branch instruction from outside the instruction sequence into the instruction sequence skipping the instruction sequence definition does not enable execution in the instruction sequence definition specified execution mode.

In some embodiments, such as a twenty-second example embodiment that is a processor according to the sixteenth example embodiment, the in-sequence execution mode determines at least in part the instruction types that are enabled during the execution of the instruction sequence.

According to various embodiments that are processors according to the twenty-second example embodiment, one or more of: supervisor-state instruction types are not enabled; I/O instruction types are not enabled; and attempting to execute a disabled instruction type causes an exception. Further, in some embodiments, the exception enables execution in the third execution mode.

In some embodiments that are processors according to any of the twelfth or fifteenth example embodiments, if at least one type of interrupt-causing event occurs during the execution of the instruction sequence, then an interrupt due to the event is held pending until the completion of execution of the instruction sequence. Further, according to various embodiments, the interrupt-causing event is one or more of
 a non-maskable interrupt,
 a system-management interrupt,
 a timer interrupt,
 a core migration interrupt,
 an I/O interrupt, or
 a power-management interrupt.

In some embodiments that are processors according to any of the twelfth or fifteenth example embodiments, if at least one type of hardware event occurs during the execution of the instruction sequence, then a hardware action due to the event is held pending until the completion of execution of the instruction sequence. Further, according to various embodiments, the hardware event is one or more of a power-management event, a thermal event, or a core migration event.

In some embodiments that are processors according to any of the twelfth or fifteenth example embodiments, the in-sequence execution mode is a non-interruptible mode. In further embodiments, one or more types of interrupts are optionally and/or selectively enabled to be recognized in the non-interruptible mode during processing (such as execution) of a particular type of instruction, such as a particular type of no-op instruction.

In some embodiments that are processors according to the twelfth example embodiment, the in-sequence execution mode includes an atomic mode. Further, in some embodiments, the atomic mode is interruptible by power-management events.

According to various embodiments that are processors according to the eighteenth example embodiment, at least one of the pre-sequence and post-sequence execution modes enables one or more of: at least one type of interrupt to be taken that the in-sequence execution mode disables; and at least one type of hardware event to be processed that the in-sequence execution mode disables.

In some embodiments that are processors according to the sixteenth example embodiment, the occurrence of an interrupt not disabled in the in-sequence execution mode during the execution of the instruction sequence is recorded in a machine-state register.

In some embodiments, such as a twenty-third example embodiment that is a processor according to the eighteenth example embodiment, a machine-state register specifies a maximum number of instructions and/or cycles to be executed in the instruction sequence according to the in-sequence execution mode.

According to various embodiments that are processors according to the twenty-third example embodiment, execution of the instruction sequence for longer than the maximum number of instructions and/or cycles causes and/or enables one or more of: an exception; and execution according to the post-sequence execution mode. Further, in some embodiments, the exception enables execution according to the post-sequence execution mode. Further, in various embodiments, a first portion of the instruction sequence is executed in the in-sequence execution mode, and a subsequent portion of the instruction sequence is executed in the post-sequence execution mode.

In some embodiments that are processors according to any of the twelfth or thirteenth example embodiments, the instruction sequence contains transfer-of-control instructions, such as branch instructions. Further, in some embodiments, the transfer-of-control instructions transfer control within the instruction sequence.

In some embodiments, such as a twenty-fourth example embodiment, a method for executing instructions in a processor includes: supplying information derived from at least some instructions of an instruction stream to one or more execution units in a form of bundles of instructions; executing at least some of the bundles by the execution units; recognizing, in the instruction stream, a start of an instruction sequence, the instruction sequence specified by an instruction sequence definition, the instruction sequence including a plurality of the instructions, and the instruction sequence being one of the bundles; controlling, at least in part, operation with respect to each of the at least some of the bundles by an execution mode of the bundle; and wherein the instruction sequence definition specifies a location of a last one of the instructions of the instruction sequence, and the instruction sequence definition specifies a particular one of the execution modes.

In some embodiments, such as a twenty-fifth example embodiment, a method for executing instructions in a processor includes: supplying information derived from at least some instructions of an instruction stream to one or more execution units in a form of bundles of instructions; executing at least some of the bundles by the execution units; recognizing, in the instruction stream, a start of an instruction sequence, the instruction sequence specified by an instruction sequence definition, the instruction sequence including one or more of the instructions, and the instruction sequence being one of the bundles; controlling, at least in part, operation with respect to each of the at least some of the bundles by an execution mode of the bundle; and wherein the instruction sequence definition is associated with a particular one of the execution modes, and the particular execution mode specifies atomic execution of the instruction sequence.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a size of a unit of addressable storage; types of instructions in an instruction sequence; length of an instruction sequence; run-time of an instruction sequence; a way that an instruction sequence is defined; a way that a start of execution of an instruction sequence is determined during fetching, decoding, translating, and/or executing on a processor; types of interrupts and/or events that are possible inside or outside of an instruction sequence; types of operations or events that are possible in different modes of a processor, such as supervisor mode or user mode; issue capability of a processor executing an instruction sequence; architecture, organization, and implementation details of a processor executing an instruction sequence; number, addressability, and organization of any machine-state registers; type or types of storage used to implement machine-state registers; types of processor features controllable by machine-state registers or other mechanisms; the way that exceptions during an instruction sequence are processed; the nature of any translations performed by a trace unit; the nature of any optimizations performed on traces; the number and organization of any trace caches, as well as the way that traces are selected from among a plurality of trace caches; the way that speculative execution is performed by a processor or by a trace unit; the way that branch prediction is performed by a processor or by a trace unit; and the number of entries or stages in registers and buffers), are merely those of the described embodiments, are expected to track improvements and changes in implementation technology, and should not be construed as limitations.

Functionally equivalent techniques known in the art are employable instead of those described to embody various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments include insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

The invention claimed is:

1. A method for use in a processor, the method comprising:
    supplying information derived from a plurality of instructions of an instruction stream to at least some of one or more execution units;
    executing, in a first execution mode, the plurality of instructions by the at least some of the one or more execution units;
    executing a user-defined instruction sequence (UDIS) embedded within the instruction stream,
        wherein the instruction stream comprises a reference to a machine state register comprising the instruction sequence definition,
        wherein the machine state register specifies at least a second execution mode of the user-defined instruction stream and a constraint on the statistical behavior of the processor when executing the user-defined instruction stream, wherein the statistical behavior is at least one selected from a group consisting of a number of instructions and a number of a particular type of instruction,
        wherein the UDIS executes in the second execution mode specified by the instruction sequence definition,
        wherein the second execution mode disables an interrupt handler, and
        wherein the UDIS comprises some of the plurality of instructions;
    recognizing, while executing the UDIS in the second execution mode, an asynchronous event;
    completing the UDIS; and
    returning, in response to completing the UDIS, to the plurality of instructions executing in the first execution mode, wherein the interrupt handler is enabled in the first execution mode.

2. The method of claim 1, further comprising fetching, by a fetch unit, the plurality of instructions.

3. The method of claim 2, further comprising controlling the fetching, at least in part, by the first execution mode.

4. The method of claim 1, further comprising decoding, by a decode unit, the plurality of instructions.

5. The method of claim 4, further comprising controlling decoding the plurality of instructions, at least in part, by the first execution mode.

6. The method of claim 4, wherein decoding the plurality of instructions produces, at least in part, the information.

7. The method of claim 6, wherein the asynchronous event is held pending while the UDIS is executed in the second execution mode.

8. The method of claim 1, wherein supplying the information comprises providing a subset of the information, the subset derived from the UDIS, and recognizing the asynchronous event occurs prior to providing the subset.

9. The method of claim 1, wherein supplying the information comprises providing a subset of the information, the subset derived from the plurality of instructions of the instruction stream, and recognizing the asynchronous event occurs subsequent to providing the subset.

10. The method of claim 1, wherein the UDIS is specified by a start-instruction-sequence code in the instruction stream.

11. The method of claim 1, wherein the machine-state registers specify a span of memory, and instructions of the UDIS are contained within the span of memory.

12. The method of claim 1, wherein a state accessed by the processor specifies a span of memory and instructions of the UDIS are contained within the span of memory.

13. The method of claim 1, wherein the instruction sequence definition specifies a location of a first instruction of the UDIS.

14. The method of claim 1, wherein the second execution mode specifies, at least in part, atomic execution.

15. The method of claim 1, wherein the second execution mode specifies, at least in part, a debug execution mode.

16. The method of claim 1, wherein at least some aspects of operation with respect to the plurality of instructions of the instruction stream are controllable through the second execution mode.

17. The method of claim 1, further comprising:
ceasing, in response to returning to the plurality of instructions executing in the first execution mode and based on the asynchronous event, execution of the plurality of instructions by the interrupt handler.

18. A processor comprising:
one or more execution units enabled to:
execute, in a first execution mode, a plurality of instructions of an instruction stream; and
execute, in a second execution mode specified by an instruction sequence definition, a user-defined instruction sequence (UDIS) embedded within the instruction stream,
wherein the instruction stream comprises a reference to a machine state register comprising the instruction sequence definition,
wherein the machine state register specifies at least the second execution mode of the user-defined instruction stream and a constraint on the statistical behavior of the processor when executing the user-defined instruction stream, wherein the statistical behavior is at least one selected from a group consisting of a number of instructions and a number of a particular type of instruction, and
wherein the second execution mode disables an interrupt handler;
an instruction supply unit enabled to supply information derived from the plurality of instructions of the instruction stream to at least some of the execution units; and
a control circuit enabled to:
instruct the one or more execution units to execute the plurality of instructions in the first execution mode;
instruct the one or more execution units to execute the UDIS in the second execution mode;
recognize, while executing the UDIS in the second execution mode, an asynchronous event;
instruct the one or more execution units to complete execution of the UDIS in the second execution mode; and
instruct the one or more execution units to return, in response to completing the UDIS, to the plurality of instructions executing in the first execution mode.

19. The processor of claim 18, wherein the at least some of the one or more execution units are further enabled to control execution, at least in part, by the second execution mode.

20. The processor of claim 18, wherein the instruction supply unit is further enabled to be controlled with respect to instructions of the UDIS, at least in part, by the second execution mode.

21. The processor of claim 18, wherein the control circuit is responsive to the information.

22. The processor of claim 18, wherein the UDIS is specified by a start-instruction-sequence code in the instruction stream.

23. The processor of claim 22, wherein the instruction sequence definition is specified, at least in part, in-line in the instruction stream after the start-instruction-sequence code.

24. The processor of claim 23, wherein the instruction sequence definition comprises a length of the UDIS.

25. The processor of claim 24, wherein the length is a byte length.

26. The processor of claim 18, wherein the instruction sequence definition specifies a location of a first instruction of the UDIS.

27. The processor of claim 18, wherein the second execution mode specifies, at least in part, atomic execution.

28. The processor of claim 18, wherein the second execution mode specifies, at least in part, a debug execution mode.

29. The processor of claim 18, wherein machine-state registers specify a maximum execution duration of the UDIS.

30. The processor of claim 29, wherein the maximum execution duration is a number of instructions.

31. The processor of claim 18, wherein the control circuit is further enabled to:
instruct the one or more execution units to revert to the first execution mode when execution of the UDIS is complete; and
instruct, in response to reverting to the first execution mode and based on the asynchronous event, the one or more execution units to cease execution of the plurality of instructions.

32. A processor comprising:
means for supplying information derived from a plurality of instructions of an instruction stream;
means for executing, in a first execution mode, the plurality of instructions, the means for executing operable in response to the means for supplying;
means for executing a user-defined instruction sequence (UDIS) embedded within the instruction stream,
wherein the instruction stream comprises a reference to a machine state register comprising to the instruction sequence definition,
wherein the machine state register specifies at least a second execution mode of the user-defined instruction stream and a constraint on the statistical behavior of the processor when executing the user-defined instruction stream, wherein the statistical behavior is at least one selected from a group consisting of a number of instructions and a number of a particular type of instruction, wherein the UDIS executes in the second execution mode specified by the instruction sequence definition, wherein the second execution mode disables an interrupt handler, and wherein the UDIS comprises some of the plurality of instructions;

means for recognizing, while executing the UDIS in the second execution mode, an asynchronous event;

means for completing the UDIS; and means for returning, in response to completing the user-defined instruction sequence, to the plurality of instructions executing in the first execution mode, wherein the interrupt handler is enabled in the first execution mode.

33. The processor of claim 32, wherein the means for executing is operable to execute the UDIS in accordance with the second execution mode.

34. The processor of claim 32, further comprising:

means for ceasing, in response to returning to the plurality of instructions executing in the first execution mode and based on the asynchronous event, execution of the plurality of instructions.

35. A non-transitory medium readable by a computer system that contains descriptions that specify, when processed by the computer system, a method comprising:

supplying information derived from a plurality of instructions of an instruction stream to at least some of one or more execution units;

executing, in a first execution mode, the plurality of instructions by the at least some of the one or more execution units;

executing a user-defined instruction sequence (UDIS) embedded within the instruction stream, wherein the instruction stream comprises a reference to a machine state register comprising the instruction sequence definition, wherein the machine state register specifies at least a second execution mode of the user-defined instruction stream and a constraint on the statistical behavior of the processor when executing the user-defined instruction stream, wherein the statistical behavior is at least one selected from a group consisting of a number of instructions and a number of a particular type of instruction, wherein the UDIS executes in the second execution mode specified by the instruction sequence definition, wherein the second execution mode disables an interrupt handler, and wherein the UDIS comprises some of the plurality of instructions;

recognizing, while executing the UDIS in the second execution mode, an asynchronous event;

completing the UDIS; and returning, in response to completing the UDIS, to the plurality of instructions executing in the first execution mode, wherein the interrupt handler is enabled in the first execution mode.

36. The non-transitory medium of claim 35, further comprising decoding the plurality of instructions to produce, at least in part, the information derived from the plurality of instructions.

37. The non-transitory medium of claim 36, further comprising controlling decoding the plurality of instructions, at least in part, by the first execution mode.

38. The non-transitory medium of claim 35, the method further comprising:

ceasing, in response to returning to the plurality of instructions executing in the first execution mode and based on the asynchronous event, execution of the plurality of instructions by the interrupt handler.

* * * * *